United States Patent
Feng et al.

(10) Patent No.: US 8,180,628 B2
(45) Date of Patent: May 15, 2012

(54) APPARATUS AND METHOD FOR EXPANDING NATURAL LANGUAGE QUERY REQUIREMENT

(75) Inventors: Qiangze Feng, Beijing (CN); Hongwei Qi, Beijing (CN); Toshikazu Fukushima, Beijing (CN); Bangyong Liang, Beijing (CN); Xin Meng, Beijing (CN); Yuguang Liu, Beijing (CN)

(73) Assignee: NEC (China) Co., Ltd., Beijing (CN)

( * ) Notice: Subject to any disclaimer, the term of this patent is extended or adjusted under 35 U.S.C. 154(b) by 985 days.

(21) Appl. No.: 12/167,809

(22) Filed: Jul. 3, 2008

(65) Prior Publication Data
US 2009/0012778 A1 Jan. 8, 2009

(30) Foreign Application Priority Data
Jul. 5, 2007 (CN) .......................... 2007 1 0127431

(51) Int. Cl.
*G06F 17/27* (2006.01)
(52) U.S. Cl. ................................. 704/9; 704/7; 704/257
(58) Field of Classification Search ................ 704/1–10, 704/251, 257, 270, 270.1; 707/8, 999.003
See application file for complete search history.

(56) References Cited

U.S. PATENT DOCUMENTS 7,664,734 B2 * 2/2010 Lawrence et al. ...... 707/999.003
7,747,601 B2 * 6/2010 Cooper et al. ................ 707/708

FOREIGN PATENT DOCUMENTS

| CN | 1794240 A | 6/2006 |
|---|---|---|
| JP | 62-276632 A | 12/1987 |
| JP | 2005-63185 A | 3/2005 |
| JP | 2005-275524 A | 10/2005 |
| JP | 2006-106970 A | 4/2006 |

* cited by examiner

*Primary Examiner* — Huyen X. Vo
(74) *Attorney, Agent, or Firm* — Sughrue Mion, PLLC

(57) ABSTRACT

The present invention provides an apparatus for expanding a query requirement, comprising: a query requirement understanding device which generates an explicit query requirement according to a user query request; and a query requirement expanding device which generates an implicit query requirement associated with the explicit query requirement. The query requirement understanding device generates an explicit query requirement including a query concept and a question type by searching a knowledge base and a language base, and the query requirement expanding device generates an implicit query requirement including a query concept and a question type by searching the knowledge base, the language base and a relevancy database. The present invention further provides a method for expanding a query requirement. The apparatus and method for expanding a query requirement according to the present invention can facilitate a user's query and provide the user with an accurate, comprehensive query answer.

41 Claims, 22 Drawing Sheets

```
Public query language

DefSyntax Attribute value query
{
    Syntax: <?A>[of]<?C(?cate)>
}

Traffic status field query language

DefSyntax Traffic status: Attribute value query
(?cate=road|bridge, ?A=traffic status)
{
    Syntax:<?C(road|bridge)><blocked|congested|unblocked>)
    Action: Traffic status query(?C)
}

Public transportation field query language

DefSyntax Route: Attribute value query
(?cate=location, ?A=route)
{
    Syntax:<how|by what|through what><go to|arrive|reach>
    <?C(location)>
    Action:Route query(?C)
}

Yellowpage field query language

DefSyntax Address: Attribute value query
(?cate=location, ?A=address)
{
    Syntax:<?C(location)><is><where|which place|which
    location|which position>
    Action: Address query(?C)
}
```

Fig. 4

| Phrase 1 | Phrase 2 | Relevance type | Relevancy |
|---|---|---|---|
| Hailong Building | Zhongguancun Street | semantic | 1 |
| Hailong Building | Zhongguancun Street | statistical | 0.7 |
| Pacific | Pacific Building | character string | 0.6 |
| address | route | service | 0.9 |
| ... | ... | ... | ... |

Fig. 5a

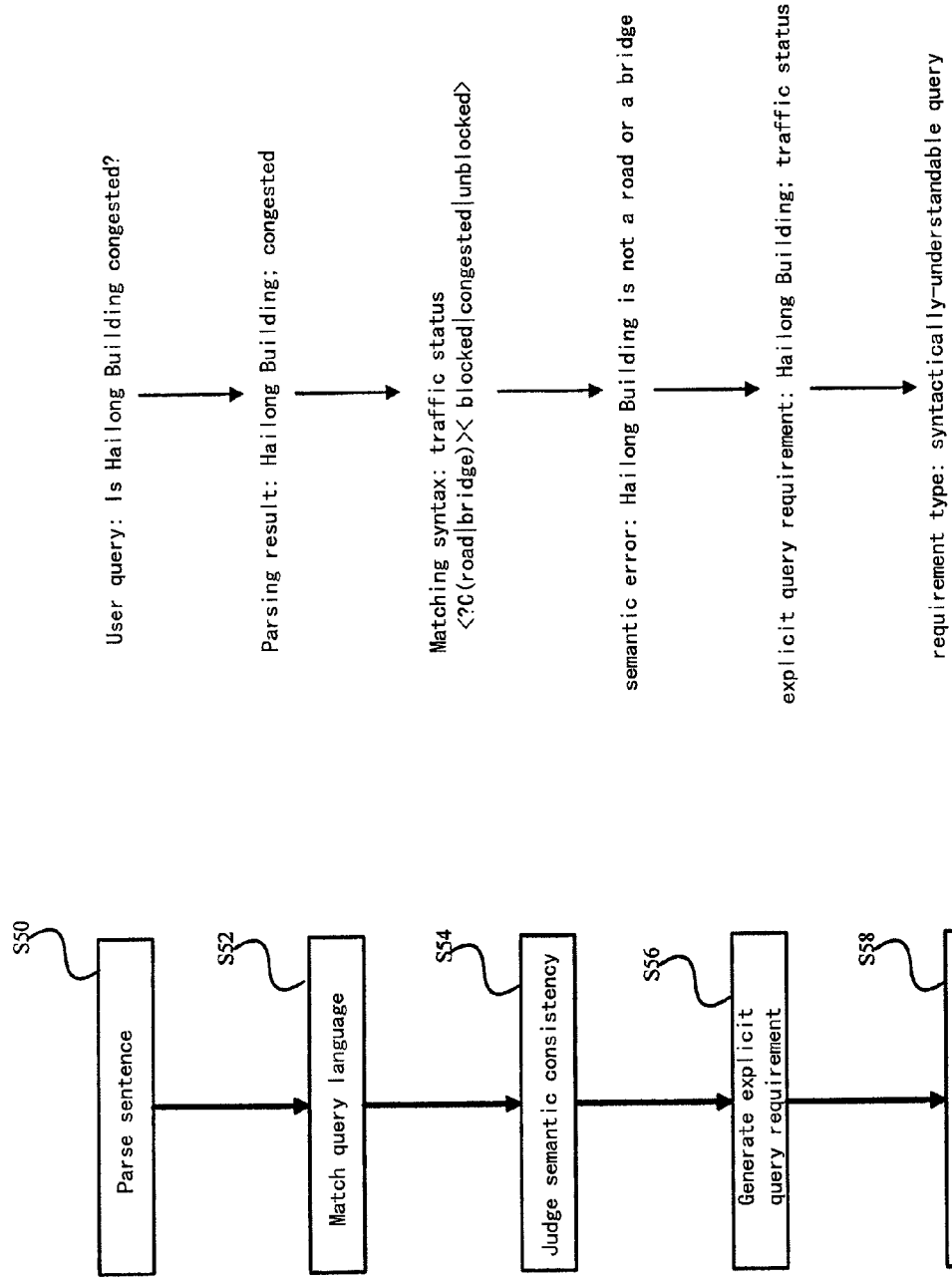

ved query concept and searches the knowledge base and

APPARATUS AND METHOD FOR EXPANDING NATURAL LANGUAGE QUERY REQUIREMENT

BACKGROUND OF THE INVENTION

1. Field of Invention

The present invention relates to the field of information query, and particularly to an apparatus and method for expanding natural language query requirement.

2. Description of Prior Art

Currently, there are various systems for providing query results based on the query request transmitted by a user. In general, the user wants to obtain more information than the query request transmitted by him/her while conducting a natural language query. For example, when the user queries where the Hailong Building is, he/she may want to learn how to arrive at the Hailong Building in addition to its address. Therefore, it is desirable that the user's potential query requirement, i.e., implicit query requirement, can be inferred from his/her current query. On the other hand, the known query systems can only generate a direct query answer associated with the user's current query without giving further consideration to the user's potential query requirement for further expansion of the current query.

Some related query systems and methods have been proposed. US20050289124 provides a system and method for processing natural language query, which can process the English natural language query from a user, generate corresponding semantic label and retrieve corresponding information from a knowledge base.

U.S. Pat. No. 6,411,950 discloses an expanding method of keyword query, which utilizes a query log to expand an abstract word in the keyword query into a specific word having a high query frequency. As an example, the query word "car" is expanded as ("car audio" OR "rent a car" OR "car price" OR . . . ).

U.S. Pat. No. 6,480,843 also reveals an expanding method of keyword query, which expands the words in the keyword query by using semantic similarity between words. For example, "car dealer" in a keyword query can be expanded as [("car" OR "automobile" OR "auto" OR "Ford")] AND ("Dealer" OR "Showroom" OR "SalesOffice").

In summary, the existing query systems and methods can either analyze an explicit query requirement as disclosed in US20050289124 or expand the words in the keyword query as recorded in U.S. Pat. Nos. 6,411,950 and 6,480,843. Therefore, there still exists a demand for a method which can effectively expand the current explicit query requirement in natural language query.

SUMMARY OF THE INVENTION

The present invention is made to solve the above problems. The present invention provides an apparatus and method for expanding natural language query requirement, which can analyze a received user natural language query and obtain an implicit query requirement so as to expand the user's query requirement and generate expanded answer information. By expanding the user's query requirement, the apparatus for expanding natural language query requirement is facilitated to better understand the user's query intention and explore the user's potential interest and requirement so as to provide sufficient and thorough answer information to the user.

According to the first aspect of the present invention, an apparatus for expanding a query requirement is provided comprising:

a query requirement understanding device which generates an explicit query requirement according to a user query request; and a query requirement expanding device which generates an implicit query requirement associated with the explicit query requirement.

According to the second aspect of the present invention, an apparatus for expanding a query requirement is provided, in which the query requirement understanding device generates the explicit query requirement by analyzing a received user query semantically and syntactically; and the query requirement expanding device generates the implicit query requirement associated with the explicit query requirement by searching a requirement relevant database which is internal to the apparatus or external to the apparatus.

According to the third aspect of the present invention, an apparatus for expanding a query requirement is provided, in which the query requirement understanding device generates the explicit query requirement including a query concept and a question type by searching a knowledge base and a language base; and the query requirement expanding device generates the implicit query requirement including a query concept and a question type by searching the knowledge base, the language base and a relevancy database.

According to the fourth aspect of the present invention, an apparatus for expanding a query requirement is provided, in which the query requirement understanding device comprises:

a parsing unit which parses the user query based on the knowledge base and the language base;

a matching unit which matches the parsed user query with the language base to find a matched syntax;

a semantic consistency judging unit which judges whether there is any semantic error in the concept in the user query based on the knowledge base and the language base;

an explicit query requirement generating unit which generates the explicit query requirement corresponding to the matched syntax and including the query concept and the question type based on the matched syntax; and a requirement type judging unit which judges which type the explicit query requirement belongs to, semantically understandable, syntactically understandable or syntactically non-understandable, based on the knowledge base and the language base.

According to the fifth aspect of the present invention, an apparatus for expanding a query requirement is provided, in which the query requirement expanding device comprises:

a semantically-understandable query requirement expanding device which retrieves the relevancy database according to a semantically-understandable explicit query requirement and obtains a relevant query requirement set that is associated with the semantically-understandable query requirement and includes an implicit query requirement containing a relevant query concept and a relevant question type or a query concept and a relevant question type.

According to the sixth aspect of the present invention, an apparatus for expanding a query requirement is provided, in which the query requirement expanding device comprises:

a syntactically-understandable query requirement expanding device which forms a relevant query concept set which has a high relevancy with the query concept contained in a syntactically-understandable explicit query requirement based on the knowledge base and the relevancy database, selects from the relevant query concept set at least one relevant query concept satisfying a predefined constraint condition by utilizing the knowledge base and combines the at least one selected relevant query concept with the question type of the explicit query requirement, as the implicit query requirement.

According to the seventh aspect of the present invention, an apparatus for expanding a query requirement is provided, in which the query requirement expanding device comprises:

a syntactically non-understandable query requirement expanding device which retrieves the question type similar to the question type included in the explicit query requirement by utilizing the language base, and/or searches the query concept similar to the unrecognized query concept in the explicit query requirement by utilizing the knowledge base and the relevancy database, so as to obtain an implicit query requirement including the similar query concept and/or the similar question type.

According to the eighth aspect of the present invention, an apparatus for expanding a query requirement is provided, in which the query requirement expanding device comprises:

a semantically-understandable query requirement expanding device which retrieves the relevancy database according to a semantically-understandable explicit query requirement and obtains a relevant query requirement set that is associated with the semantically-understandable query requirement and includes an implicit query requirement containing a relevant query concept and a relevant question type or a query concept and a relevant question type;

a syntactically-understandable query requirement expanding device which forms a relevant query concept set which has a high relevancy with the query concept contained in a syntactically-understandable explicit query requirement based on the knowledge base and the relevancy database, selects from the relevant query concept set at least one relevant query concept satisfying a predefined constraint condition by utilizing the knowledge base and combines the at least one selected relevant query concept with the question type of the explicit query requirement, as the implicit query requirement; and a syntactically non-understandable query requirement expanding device which retrieves the question type similar to the question type included in the explicit query requirement by utilizing the language base, and/or searches the query concept similar to the unrecognized query concept in the explicit query requirement by utilizing the knowledge base and the relevancy database, so as to obtain an implicit query requirement including the similar query concept and/or the similar question type.

According to the ninth aspect of the present invention, a method for expanding a query requirement is provided comprising:

a query requirement understanding step of generating an explicit query requirement according to a user query request; and a query requirement expanding step of generating an implicit query requirement associated with the explicit query requirement.

According to the tenth aspect of the present invention, a method for expanding a query requirement is provided, in which the query requirement understanding step comprises step of generating the explicit query requirement by analyzing a received user query semantically and syntactically; and the query requirement expanding step comprises step of generating the implicit query requirement associated with the explicit query requirement by searching a requirement relevant database.

According to the eleventh aspect of the present invention, a method for expanding a query requirement is provided, in which the query requirement understanding step comprises step of generating the explicit query requirement including a query concept and a question type by searching a knowledge base and a language base; and the query requirement expanding step comprises step of generating the implicit query requirement including a query concept and a question type by searching the knowledge base, the language base and a relevancy database.

According to the twelfth aspect of the present invention, a method for expanding a query requirement is provided, in which the query requirement expanding step comprises at least one of the following steps:

a semantically-understandable query requirement expanding step of retrieving the relevancy database according to a semantically-understandable explicit query requirement and obtaining a relevant query requirement set that is associated with the semantically-understandable query requirement and includes an implicit query requirement containing a relevant query concept and a relevant question type or a query concept and a relevant question type;

a syntactically-understandable query requirement expanding step of forming a relevant query concept set which has a high relevancy with the query concept contained in a syntactically-understandable explicit query requirement based on the knowledge base and the relevancy database, selecting from the relevant query concept set at least one relevant query concept satisfying a predefined constraint condition by utilizing the knowledge base and combining the at least one selected relevant query concept with the question type of the explicit query requirement, as the implicit query requirement; and a syntactically non-understandable query requirement expanding step of retrieving the question type similar to the question type included in the explicit query requirement by utilizing the language base, and/or searching the query concept similar to the unrecognized query concept in the explicit query requirement by utilizing the knowledge base and the relevancy database, so as to obtain an implicit query requirement including the similar query concept and/or the similar question type.

BRIEF DESCRIPTION OF THE DRAWINGS

FIG. 4 is a schematic diagram of a language base according to the present invention;

FIG. 5a is a schematic diagram of a relevancy database according to the present invention;

FIG. 6b is a flowchart of a query requirement understanding method according to the present invention;

FIG. 6c is an example of a query requirement understanding operation according to the present invention;

DETAILED DESCRIPTION OF PREFERRED EMBODIMENTS

Now, a description will be give to the preferred embodiments of the present invention with reference to the figures, throughout which the same elements are denoted by the same reference symbols or numbers. Besides, in the following description, detailed explanation of known functions and configurations will not be repeated, otherwise, it may obscure the subject of the present invention.

Figure 1A:
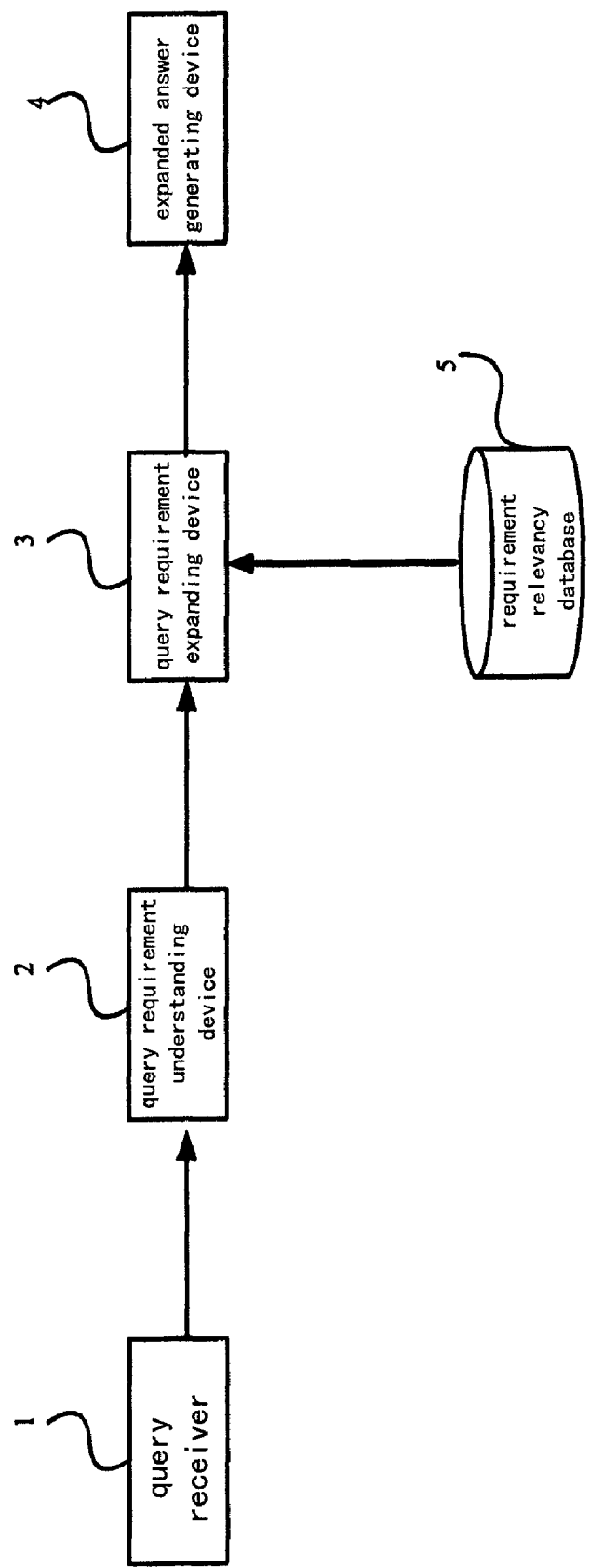
FIG. 1a is a schematic diagram of an apparatus for expanding natural language query requirement according to one embodiment of the present invention.

FIG. 1a is a schematic diagram of an apparatus for expanding natural language query requirement according to one embodiment of the present invention. Based on a query requirement inputted by a user, the apparatus for expanding natural language query requirement generates an implicit query requirement and a corresponding expanded answer by retrieving a requirement relevancy database 5. The apparatus for expanding natural language query requirement includes a query receiver 1 for receiving a query request from a user, a query requirement understanding device 2, a query requirement expanding device 3 for retrieving the requirement relevancy database internal or external to the apparatus for expanding natural language query requirement to generating an implicit query requirement, and an expanded answer generating device 4.

Figure 1B:
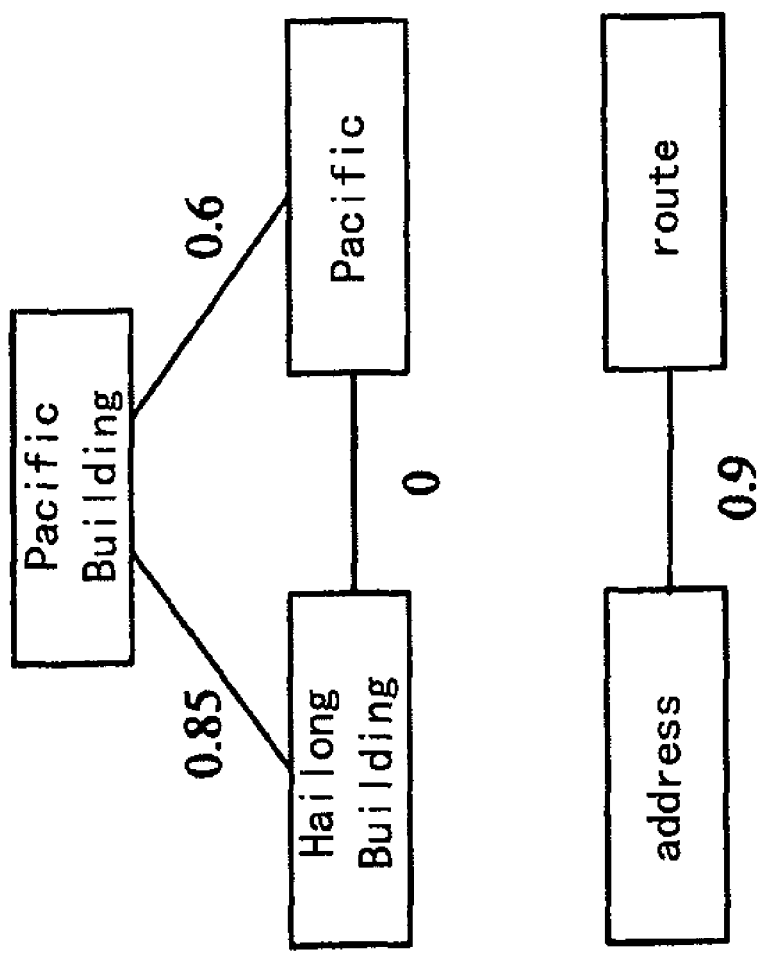
FIG. 1b is an example of a requirement relevancy database.
Figure 1C:
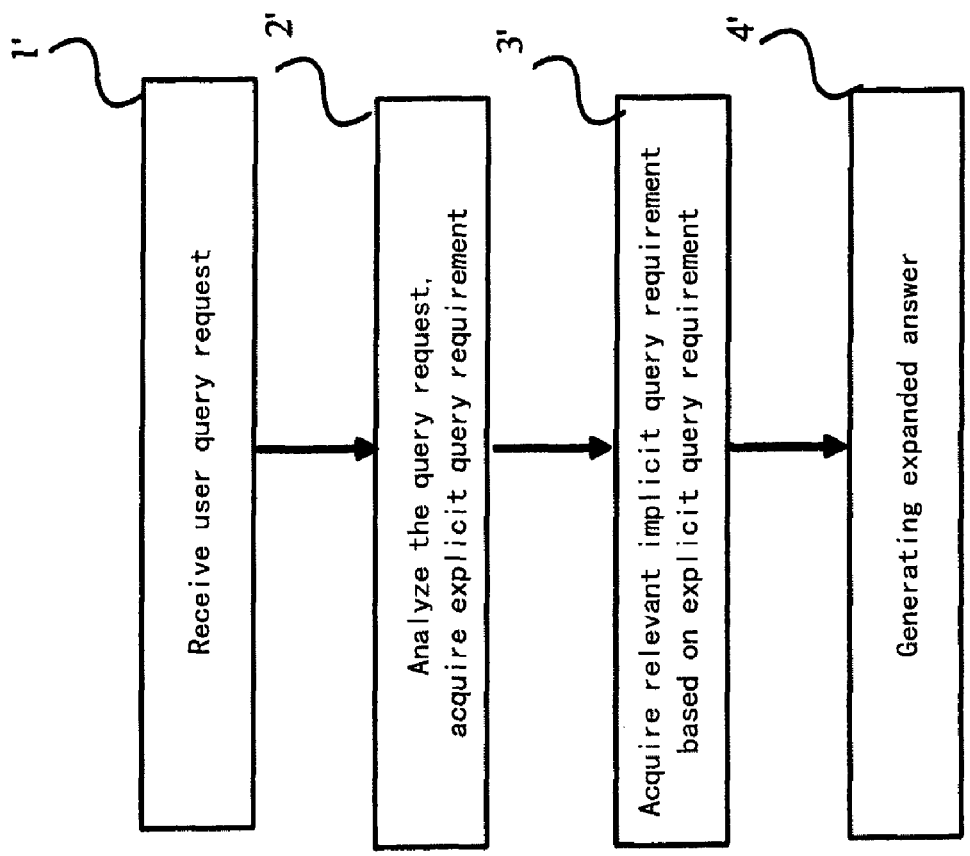
FIG. 1c is a flowchart of a method for expanding natural language query requirement according to one embodiment of the present invention.

FIG. 1c is a flowchart of a method for expanding natural language query requirement according to one embodiment of the present invention, in which an expanded answer is generated. The query receiver 1 receives the query request from the user at step 1'. At step 2', the query requirement understanding device 2 analyzes the query request for an explicit query requirement semantically and syntactically and find out an explicit query requirement containing a query concept and a question type in the query request, as the user's explicit query requirement. The query requirement understanding device 2 can adopt heuristic rules or machine learning approach to decide the question type corresponding to the user's explicit query requirement, and then make a noun in the user query request as the query concept. The question type should be determined at first. So far, there are mainly two methods, one is deciding based on certain heuristic rules that have been summarized manually, and the other is automatic classification of questions. In addition, the method shown in FIG. 6c can be used to acquire the explicit query requirement.

1) Method of heuristic rules: summarizing heuristic rules based on the interrogatives or other words (e.g., verbs, nouns, adverbs, adjectives) present in the user query request. For example, the rule "where/which place->address" denotes that the question type is normally an address when "where/which place" exist in the user query request. As another example, the rule "how/by what, arrive/go/reach->route" means that the question type is usually a route if "how/by what" and "arrive/go/reach" have appeared in the user query request.

Then, the question type corresponding to the user query request can be decided in accordance with such heuristic rules.

2) Method of automatic classification: identifying and classify a question into one or more semantic categories by means of machine learning. Major approaches are utilizing a word as feature item, utilizing syntax information and semantic information. Unfortunately, the result of automatic classification is not accurate enough, and the known automatic classification methods commonly have accuracies lower than 90%.

After acquiring the question type, the query requirement understanding device 2 extracts the remaining nouns in the user query requirement as the query concept.

For example, as to the user query requirement "where is the Hailong Building?" containing "where", the question type can be determined as an address according to the heuristic rule "where/which place->address", and then the nouns "Hailong Building" are extracted as the concept. As such, an explicit query requirement is obtained as "Hailong Building; address".

At step 3', with the obtained explicit query requirement, the query requirement expanding device 3 first retrieves the requirement relevancy database 5 based on the query concept and the question type in the user query and obtains a relevant query concept set and a relevant question type set. FIG. 1b shows an example of the requirement relevancy database 5, which stores the relevancy between respective concepts and the relevancy between respective question types. Then, the query requirement expanding device 3 combines the obtained relevant query concepts and relevant question types to generate a relevant query requirement set, and calculates the relevancy between each relevant query requirement and the current query requirement with the following equation:

Relevancy between requirements "$c_1;t_1$" and "$c_2$; $t_2$"=Relevancy between $c_1$ and $c_2$*Relevancy between $t_1$ and $t_2$ In which $c_1$ and $c_2$ are query concepts, and $t_1$ and $t_2$ are question types.

These relevant query requirements can be sorted in a descending order based on the requirement relevancy, and the relevant query requirements having a relevancy greater than certain threshold will be construed as the final implicit query requirements.

For example, all relevant query requirements regarding the explicit query requirement "Pacific Building; address" include "Hailong Building; address" (relevancy of 0.85), "Pacific; address" (relevancy of 0.6), "Pacific Building; route" (relevancy of 0.9), "Hailong Building; route" (relevancy of 0.765) and "Pacific; route" (relevancy of 0.54). If the threshold is 0.8, the final implicit query requirements will be "Pacific Building; route" and "Hailong Building; address".

Eventually, an expanded answer is generated according to the implicit query requirements at step 4'.

Various methods can be employed to generate the requirement relevancy database 5. These methods include: (1) the existing method for calculating word similarity, that is, calculating similarity between words based on known semantic dictionaries such as Hownet, Synonym Lexicon and the like; (2) the generation method as shown in FIG. 5c, that is, calculating semantic relevancy, statistical relevancy, character-string similarity and service relevancy, and then acquiring their average as the relevancy between query concepts or question types. For example, for "Hailong Building" and "Zhongguancun Street", the semantic relevancy is 1, and the statistical relevancy is 0.7, the relevancy between them is thus (1+0.7)/2=0.85.

Figure 2:
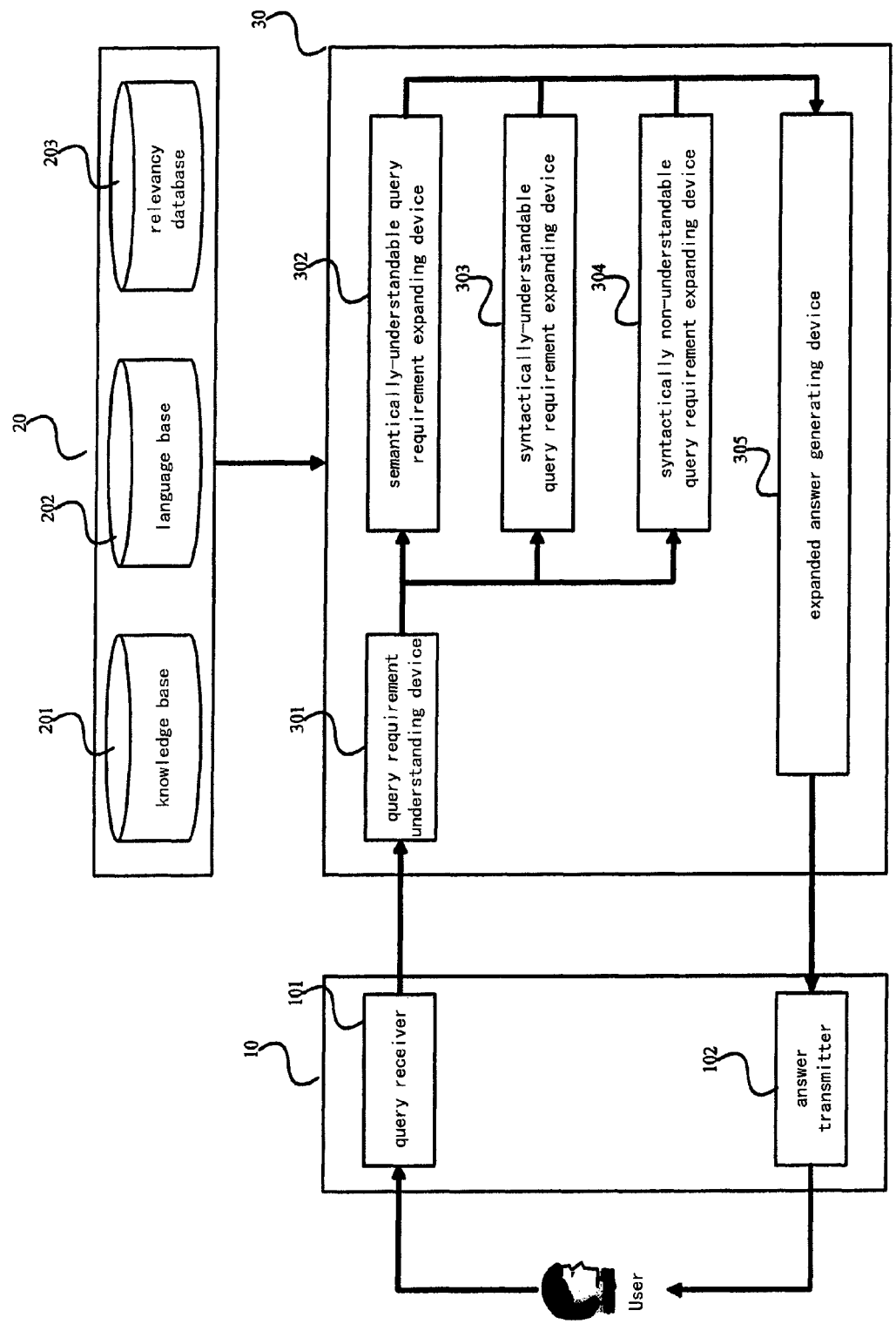
FIG. 2 is a schematic diagram of an apparatus for expanding natural language query requirement according to the present invention.

FIG. 2 shows a block diagram of an apparatus for expanding natural language query requirement. The apparatus for expanding natural language query requirement has a receiving/transmitting device 10 including a query receiver 101 and an answer transmitter 102, a memory 20 and a query analyzing expansion device 30. When receiving a natural language query request from a user via the query receiver 101, the apparatus for expanding natural language query requirement transfers the natural language query request to the query analyzing expansion device 30, which performs analysis and expansion, obtains an implicit query requirement and generates an expanded answer. The memory stores a knowledge base 201, a language base 202 and a relevancy database 203. The query analyzing expansion device 30 includes: a query requirement understanding device 301 which judges whether the user's natural language query request is a semantically-understandable query requirement, a syntactically-understandable query requirement or a syntactically non-understandable query requirement; a semantically-understandable query requirement expanding device 302, a syntactically-understandable query requirement expanding device 303 and a syntactically non-understandable query requirement expanding device 304 which generate an implicit query requirement; and an expanded answer generating device 305 which retrieves the language base, the knowledge base and an information database by using the implicit query requirement so as to generate an expanded answer. The query analyzing expansion device 30 utilizes the knowledge base 201, the language base 202 and the relevancy database 203 to expand the natural language query requirement.

It will be appreciated that the knowledge base 201, the language base 202, the relevancy database 203 and the information database (not shown) can alternatively be arranged outside the apparatus for expanding natural language query requirement, though they are shown internal to the apparatus for expanding natural language query requirement in FIG. 2. Furthermore, the apparatus for expanding natural language query requirement can also include a direct answer generating device, which can generate directly a query answer corresponding to the explicit query requirement from the user. In this way, the apparatus for expanding natural language query requirement of the present invention can obtain both of an expanded query answer and a direct query answer.

The memory 20 stores the knowledge base 201, the language base 202, the relevancy database 203 and the information database. The knowledge base 201 contains semantic knowledge used in processing a user query. The language base 202 holds language models used in understanding the user query. The relevancy database 203 includes relevancy data for expanding the user query requirement. The information database contains specific field data for generating expanded and direct answers. The query analyzing expansion device 30 can extract an explicit query requirement from the user's natural language query based on the knowledge base 201, the language base 202 and the relevancy database 203 as well as analyze it to obtain the user's expanded query requirement so as to feedback to the user more sufficient and complete answer information. Now, the knowledge base 201, the language base 202 and the relevancy database 203 will be described with reference to FIGS. 3(a), 3(b), 4, 5a and 5b, respectively. Then, a detailed explanation will be give to how to expand natural language query requirement by utilizing these databases.

1. Knowledge Base

Figure 3A:
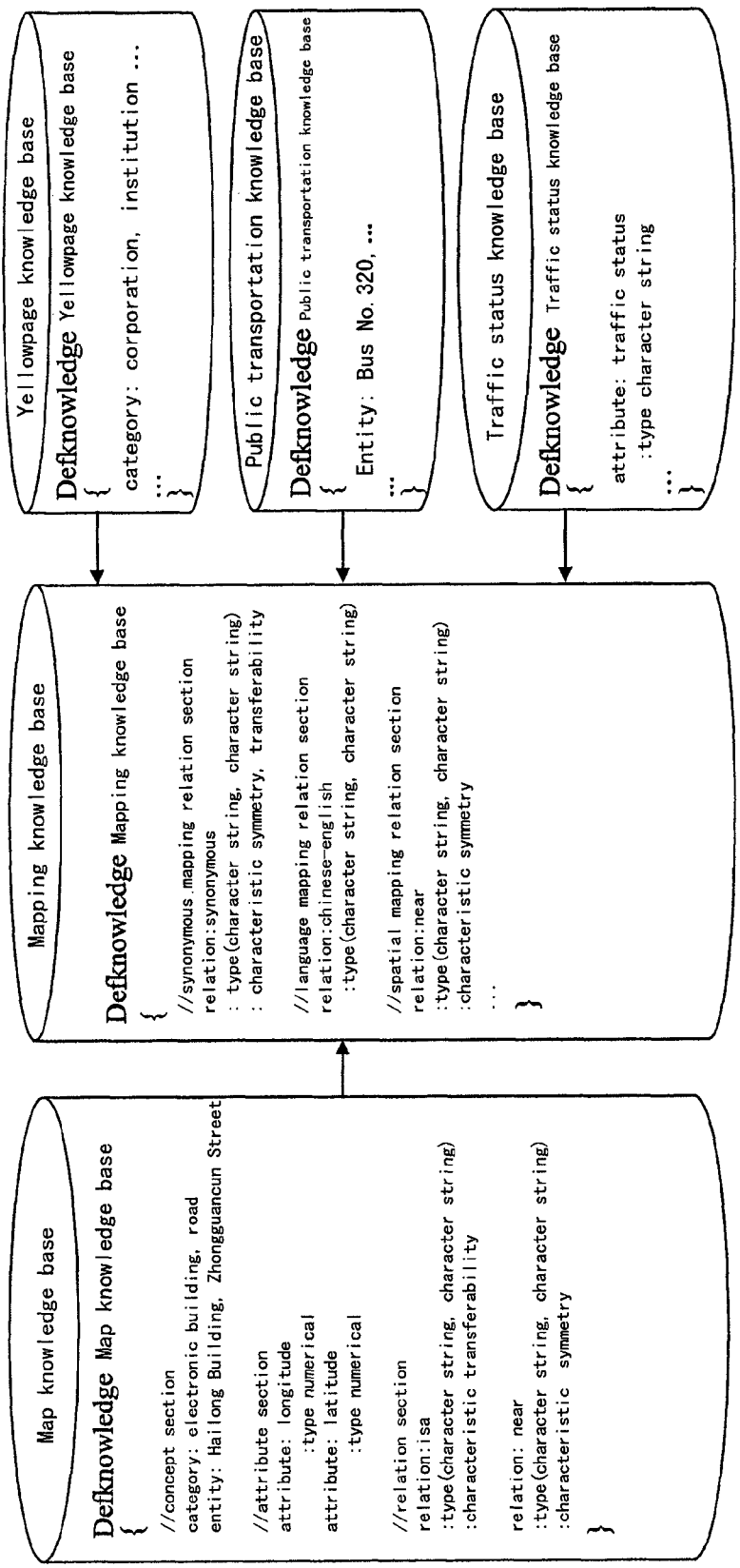
FIG. 3(a) is a schematic diagram of a knowledge base according to the present invention.

FIG. 3(a) shows an exemplary structure of the knowledge base composed of a set of field knowledge bases and a mapping knowledge base. Each field knowledge base corresponds to one field and records the semantic knowledge in this field. For example, the map field corresponds to a map knowledge base, and the yellow-page field to a yellow-page knowledge base. Knowledge about different fields is not completely independent of but associated with each other in various fashions, and these associations between concepts in different field knowledge bases are recorded by the one mapping knowledge base.

In general, each field knowledge base consists of three sections, a concept section, an attribute section and a relation section.

1) Concept section, which includes all categories and entities within the field.

For example, in the map knowledge base, the concept section contains all geographic categories and entities shown in an electronic map, in which a category indicates which category a location belongs to, such as electronic building and road. Both of them belong to a category. And an entity represents a specific location in the electronic map, such as Hailong Building, Zhongguancun Street. Both of them belong to an entity.

2) Attribute section, in which each attribute defines certain characteristic of a concept, such as longitude and latitude. Each attribute has an item "type" indicating the value type of this attribute.

3) Relation section, which depicts various associations between concepts, such as is a depicting the subordinate relation between categories or between an entity and a category, "near" indicating spatially adjacent relation between entities. Each relation has two items "type" and "characteristic", the former denotes the value type of the relation, and the latter is mainly of two forms, that is, transferability and symmetry. If $R(x, y)$ & $R(y, z)$->$R(x, z)$, R has transferability feature, and the relation of is a satisfies transferability, for example. If $R(x, y)$->$R(y, x)$, R has symmetry feature, and the relation of near, for example, meets symmetry feature.

In the map knowledge base, for instance, "isa(Hailong Building, electronic building)" means that Hailong Building is an electronic building; and "near(Hailong Building, Zhongguancun Street)" denotes that Zhongguancun Street is located near Hailong Building.

The mapping knowledge base contains only the relation section, particularly, a synonymous mapping relation section, a language mapping relation section and a spatial mapping relation section.

1) Synonymous mapping relation section, which represents mapping between synonyms or abbreviations. For example, "synonymous (Hailong Building, Hailong Electronic Building)" indicates that the two phrases are synonymous.

2) Language mapping relation section, which represents mapping between different language translations of a single concept. For example, "chinese-english(中关村大街, Zhongguancun Street)" means that the latter is the English version of the former.

3) Spatial mapping relation section, which represents mapping between concepts which are spatially related to each other. For example, "near(Hailong Building, Bus No. 320)" signifies that the two entities are located close to each other.

FIG. 3(b) shows a hierarchical view of the knowledge base, in which the hierarchical structure is automatically formed with concepts in the concept section of every field knowledge base being nodes, and the correspondences in the relation section of every field knowledge base and the mapping knowledge base being arcs.

The knowledge base is generated through two steps as follows.

First, each of the field knowledge bases is automatically generated on the basis of an information base provided by a service provider. The processing comprises steps of: 1) extracting concepts from the information base with a known information extracting algorithm to form the concept section including categories and entities; 2) extracting data fields to form the attribute section by using a known information extracting algorithm; 3) extracting relations between the concepts from the information base and semantic dictionaries with a known information extracting algorithm to form the relation section including the relations between categories, between entities and between a category and an entity. Taking the map field as an example, to generate a map knowledge base, various concepts including categories and entities are first extracted from an electronic map database to form the concept section; and then the subordinate relation between the concepts is extracted from the electronic map base to form the relation section, with the relation containing the subordinate and spatial relations between categories, between an entity and an category as well as between entities. The above processing can be executed with the functions provided by the known GIS platform.

Subsequently, the mapping knowledge base is automatically generated on the basis of the concepts in these field knowledge bases. The processing comprises steps of:

1) generating the synonymous mapping section based on a synonym dictionary and an abbreviation rule library, in which the synonym dictionary contains concepts and their synonyms, such as "Yingu Building, Yingu Electronic Building" indicating "Yingu Building" and "Yingu Electronic Building" are synonymous; the abbreviation rule library accommodates abbreviated versions of various phrases, such as "abbreviate (Peking University, PKU)" denoting "Peking University is abbreviated as PKU"; it can be judged whether two concepts are synonymous according to abbreviation rules, for example, synonymous(Affiliated Primary School of Peking University, APSPKU) can be derived from "abbreviate (Peking University, PKU)" and "abbreviate (Affiliated Primary School, APS)";

2) generating the language mapping relation section based on a multi-linguistic dictionary;

3) generating the spatial mapping relation section based on GIS function of the electronic map.

2. Language Base

The language base stores language models for understanding a user query and comprises various field query languages and a public query language. Each field corresponds to one of the field query language, such as the traffic field corresponding to the traffic field query language, the public transportation to the public transportation query language, and the yellow-page field to the yellow-page field query language. The public query language summarizes the common query features among various field query languages and can be parameter-inherited by the field query languages. The field query languages and the public query language are represented in the same manner.

FIG. 4 shows an example of the language base, in which each query language contains four parts, question type, inheritance, syntax and action.

1) Question type part. Question type can be any character string, such as "traffic status".

2) Inheritance part, which demonstrates the syntax that can be inherited by a question type. For example, "traffic status: attribute value query (?cate=bridge|road, ?A=traffic status)" represents that the syntax of "traffic status" can inherit the syntax of the question type "attribute value query" by assigning the parameters ?cate and ?A, that is, "<traffic status>[of] <?C(road/bridge)>" also belongs to the syntax of "traffic status".

3) Syntax part, which summarizes all possible natural language queries regarding a question type, such as "<?C (road|bridge)><blocked|congested|unblocked>". The syntax part is formed of a group of syntax words, such as "?C", "blocked", "congested" and "unblocked". Some special symbols are also defined in the syntax part and elaborated as follows.

"|" means "OR" logic operation.

<?X(cons$_1$| ... |cons$_m$)> means that X is a concept, cons$_i$ (i=1, ..., m) is a constraint condition for constraining the value range of the concept X. cons$_i$ is generally a category in the knowledge base, and X can be replaced only with an entity belonging to arbitrary category cons$_i$ in the knowledge base. In other words, X must satisfy isa(X, cons$_i$). For example, <?C(road|bridge)> can be replaced only with an entity as a road or a bridge (e.g., Zhongguancun Street) in the knowledge base.

"[ ]" means that the content between "[" and "]" is optional.

4) Action part, which defines query actions corresponding to a question type and indicates "which query action is generated when a user query conforms to the definition of the question type", such as "traffic status query (?C)". Query actions provide the understanding result for the user query and can be executed by an answer generating device.

The language base is generated through two steps as follows.

The first step is to collect possible user query sentences in respective fields, calculate similarity between these query sentences by use of a known sentence similarity calculation method, cluster in accordance with similarity to generate the syntax section of each field query language, and then define manually the question types and action part for each syntax. For example, from the query sentences "Is Lianxiang Bridge blocked?", "Is the Fourth North Ring Road congested?", "Is Xueyuan Road unblocked?" in the traffic status field, it is possible to obtain the syntax "<?C(road|bridge)> <blocked|congested|unblocked>" for the question type "traffic status".

The second step is to calculate similarity between the syntax parts in the respective field query languages, extract the public query language and generate the inheritance part for these field query languages. For example, from the "traffic status" syntax "<traffic status>[of]<?C(road|bridge)>" and the "address" syntax "<address>[of]<?C(location)>", it is possible to derive the "attribute value query" syntax "<?A>[<of >]<?C(?cate)>", and the inheritance part of the "traffic status" syntax is "attribute value query? (?cate=road|bridge, ?A=traffic status)".

3. Relevancy Database

FIG. 5a show an example of the relevancy database, which records the relevancy data for the relevance between all objects (concepts in the knowledge base, question types in the language base). Four types of relevancy are mainly considered.

a. Semantic relevancy representing the semantic relevance between different concepts. For example, "Hailong Building" and "Zhongguancun Street" are both locations and spatially close to each other, so they are relevant semantically. Two concepts having semantic relevance can be either entities or categories.

b. Statistical relevancy representing the statistical relevance between different concepts. For example, since "Hailong Building" and "Zhongguancun Street" often appear together in a text, they are statistically relevant.

c. Character-string similarity representing similarity in description form between different words and phrases. For example, "Pacific" and "Pacific Building" are relevant in their description forms since "Pacific" is a substring of "Pacific Building". Also, "Hailong" is a substring of "Hailong Building". Therefore, there is character-string similarity between "Pacific" and "Pacific Building" as well as between "Hailong" and "Hailong Building".

d. Service relevancy representing the relevance between services provided by different question types. For example, since both of "address" and "route" concern location service, they are relevant in terms of service.

Figure 5B:
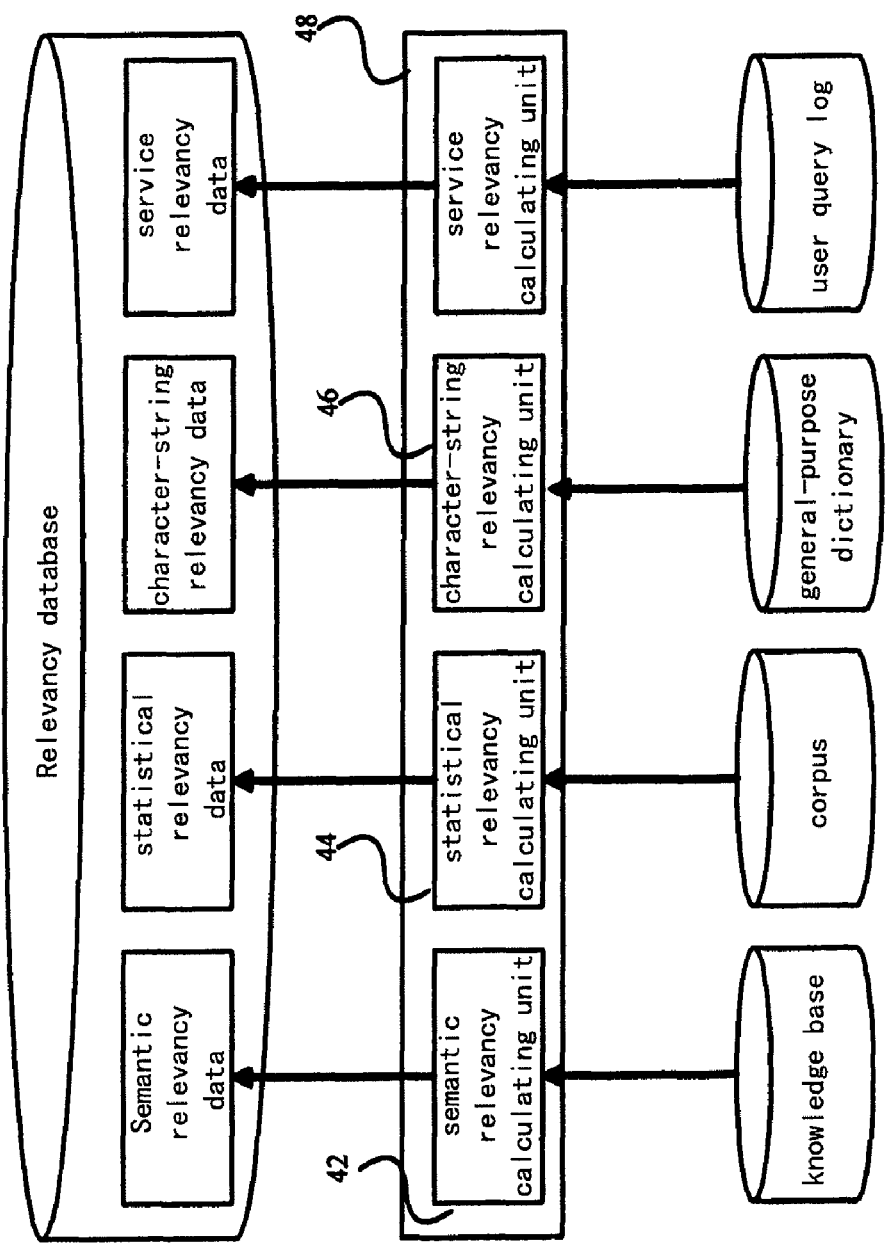
FIG. 5b is a schematic diagram of a relevancy database generating device according to the present invention.
Figure 5C:
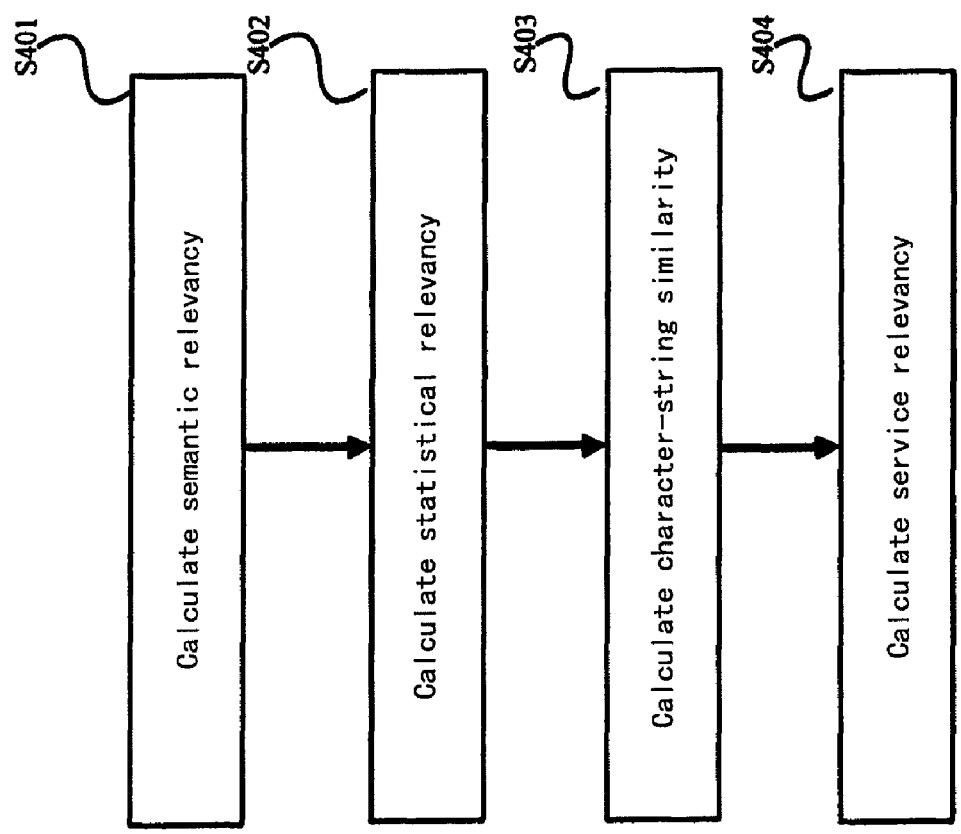
FIG. 5c is a flowchart of a method for generating a relevancy database by the relevancy database generating device.

FIG. 5b shows a schematic block diagram of a relevancy database generating device, which comprises a semantic relevancy calculating device 42 for generating semantic relevancy data by utilizing the knowledge base, a statistical relevancy calculating device 44 for generating statistical relevancy data by utilizing a corpus, a character-string similarity calculating device 46 for generating character-string similarity data based on general dictionaries, and a service relevancy calculating device 48 for generating service relevancy data by analyzing a user query log.

FIG. 5c is a flowchart of a method for generating the relevancy database by the relevancy database generating device.

At S401, the semantic relevancy calculating device 42 calculates the semantic relevancy between different concepts based on the knowledge base. Referring to FIG. 3(b) which shows a hierarchical structure of the knowledge base with concepts being nodes and relations being arcs, the semantic relevancy between two concepts can be measured with the shortest path between them. The shorter the shortest path between two concepts is, the more relevant these concepts are in terms of semantics.

The semantic relevancy can be calculated according to the following equation:

$$\text{Semantic Relevancy} = \frac{1}{Len(MinPath(x, y))} \quad (1)$$

In which Len(MinPath(x,y)) represents the shortest path length between x and y, that is, the minimum number of arcs from x to y. For example, in FIG. 3(b), the shortest path between "Hailong Building" and "Zhongguancun Street" is "Hailong Building-Near-Zhongguancun Street". Since there is only one arc, the shortest path length is 1, and the semantic relevancy between them is 1.

At S402, the statistical relevancy calculating device 44 calculates statistical relevancy. The mutual information between two concepts is calculated by performing statistic on a corpus. The corpus used in the present invention contains about 2,000,000 web pages collected from the web. Mutual information is a kind of measure in information theory for measuring the association degree between two events. The greater the mutual information between two concepts, the more statistically relevant they are. The statistical relevancy is calculated by the following equation:

$$\text{Statistical Relevancy} = \log_2 \frac{P(x, y)}{P(x)P(y)} \quad (2)$$

in which P(x,y) represents the probability x and y occur together, and P(x), P(y) are the probabilities x and y occur alone, respectively. For example, the probability both "Hailong Building" and "Zhongguancun" appear is 0.98, each of them appears alone at a probability of 0.14, so the statistical relevancy between "Hailong Building" and "Zhongguancun" is 0.7.

At S403, the character-string similarity calculating device 46 calculates character-string similarity. In the present invention, a known general-purpose dictionary recording all frequently-used words and phrases (including all concepts in the knowledge base) is employed to calculate character-string similarity between these words and phrases. A known method of edition distance can be utilized, that is, counting the number of substitution, insertion or deletion operations that are needed to make two concept strings identical to each other. The smaller the number of the operations is, the higher the character-string similarity is.

The character-string similarity can be calculated with the following equation:

$$\text{Character-string Similarity} = 1 - \frac{D(x, y)}{\text{Max}(Len(x), Len(y))} \quad (3)$$

In which D(x,y) represents the smallest number of operations to make the character strings x and y identical, and Max(Len(x), Len(y)) is the maximum length of the character strings x and y. For example, if "Pacific" is changed into "Pacific Building" by adding two Chinese characters at the end, the character-string similarity between them is 1−2/5=0.6 in Chinese.

At S404, the service relevancy calculating device 48 calculates service relevancy. Now, the query logs of all users have been recorded, each of them contains all queries submitted by a user and the corresponding query requirements. The service relevancy calculating device 48 analyzes all the user query logs and finds out the frequency that each question type of a query are questioned continuously by a user. The higher the frequency is, the greater the service relevancy between the two question types is. The service relevancy is calculated by the following equation:

Service Relevancy=$P$(question type of $Q_{n+1}$ is
 y|question type of $Q_n$ is x) (4)

This equation gives the frequency at which the question type of a user query is x and that of the following query is y. As an example, immediately after querying the address of a location, the user often asks how to arrive at the location. So, the service relevancy between "address" question type and "route" question type is high, and the calculated value is 0.9.

Figure 6A:
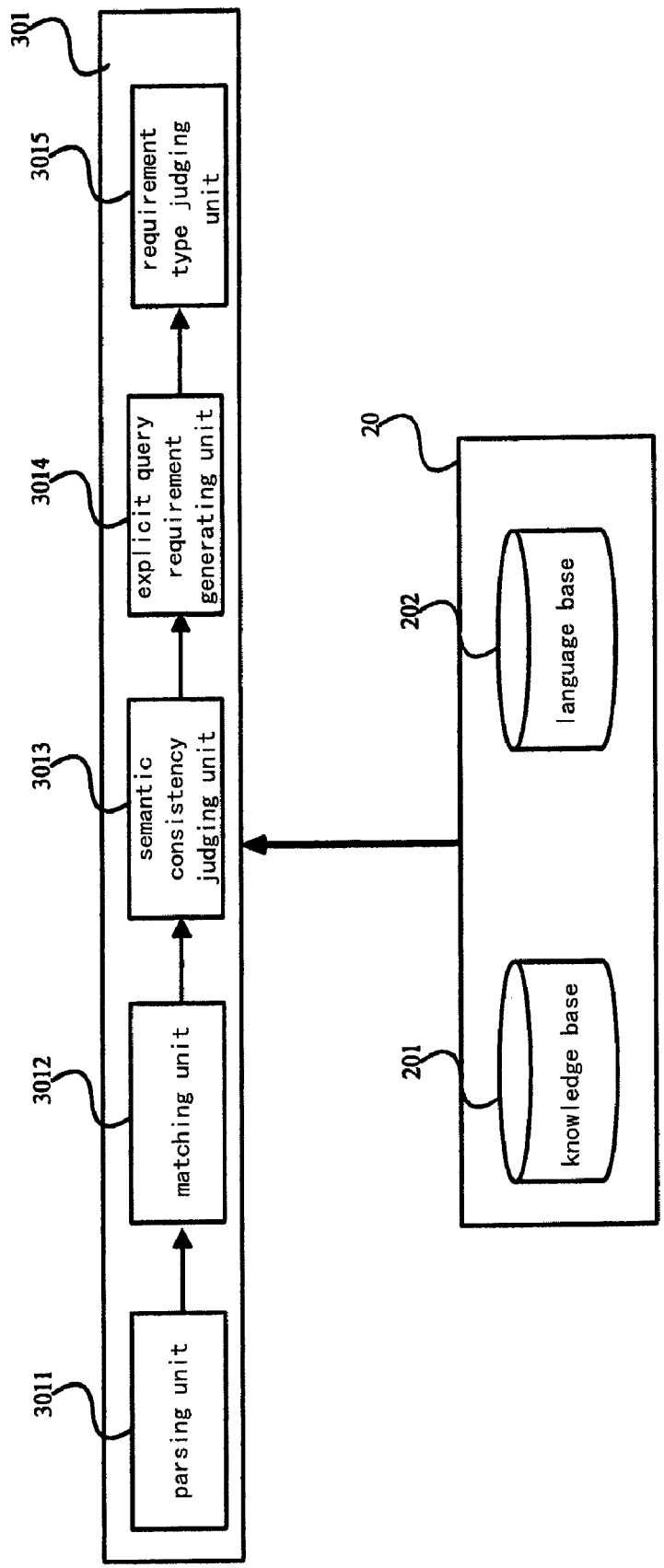
FIG. 6a is a schematic diagram of a query requirement understanding device according to the present invention.

FIG. 6a shows a block diagram of the query requirement understanding device 301, which comprises a parsing unit

3011, a matching unit 3012 connected to the parsing unit 3011, a semantic consistency judging unit 3013 connected to the matching unit 3012, an explicit query requirement generating unit 3014 connected to the semantic consistency judging unit 3013, and a requirement type judging unit 3015 connected to the explicit query requirement generating unit 3014. The parsing unit 3011 parses a user query by searching the concepts sections of the field knowledge bases in the knowledge base 201, the syntax sections of the field query languages and the public query language in the language base 202. The matching unit 3012 matches the parsed user query with the language base. The semantic consistency judging unit 3013 judges whether the concepts in the user query satisfies the concept constraint defined in the syntax corresponding to the question type based on the relation sections of the field knowledge bases in the knowledge base 201. The explicit query requirement generating unit 3014 acquires the question type corresponding to the matched syntax and combines the query concepts and the quest type into an explicit query requirement. The requirement type judging unit 3015 judges whether the requirement type to which the user query belongs is semantically understandable, syntactically understandable or syntactically non-understandable.

FIG. 6b shows a flowchart of the query requirement understanding process by the query requirement understanding device. At S50, the parsing unit 3011 parses a user query by searching the concepts sections of the field knowledge bases in the knowledge base 201, the syntax sections of the field query languages and the public query language in the language base 202.

For example, the user query "Is Hailong Building congested?" is parsed as "Hailong Building; congested", where "Hailong Building" is an entity in the map knowledge base, and "congested" is a syntax word in the query language of the traffic status field.

At S52, the matching unit 3012 matches the parsed user query with the language base to obtain the syntax matched with the user query. This matching process is conducted in such a sequence that the parsed user query is first matched with the public query language and, if there is matched syntax, parameter-matched with the field query language which can inherit the syntax; otherwise, the parsed user query is matched directly with the respective field query languages.

For example, the procedure of matching the user query "the traffic status of Hailong Building" (it is parsed as "traffic status; of; Hailong Building") with the language base is first matching with the public query language and obtaining a matching result "attribute value query: <?A>[of]<?C(?cate)>", and subsequently matching with the field query language which inherits "attribute value query" and obtaining a matching result "traffic status: attribute vale query(?cate=road|bridge, ?A=traffic status)".

As another example, the result from the matching between the user query "Is Hailong Building congested?" and the language base is "traffic status:<?C(road|bridge)> <blocked|congested|unblocked>".

At S54, the semantic consistency judging unit 3013 judges whether the concepts in the user query satisfies the concept constraint defined in the matched syntax based on the relation sections of the field knowledge bases in the knowledge base 201.

The constraint judging method is that, based on the relation of is a, judging whether the concept C in the user query satisfies one of the concept constraints "$cons_1 | \ldots | cons_m$" defined in the syntax, that is, whether there exists isa(C, $cons_i$), wherein $i=1, \ldots, m$. The user query has a semantic error if the answer of the above judgment is NO. (For example, the judging process can be facilitated with the hierarchy diagram shown in FIG. 3(b)). Taking as an example the user query "Is Hailong Building congested?", the query concept is "Hailong Building", and the concept constraint in the matched syntax is "road|bridge". Since there is neither isa (Hailong Building, road) nor isa(Hailong Building, bridge), the semantic consistency judging unit 3013 judges there is a semantic error in this user query.

At S56, the explicit query requirement generating unit 3014 acquires the query concept and the corresponding question type based on the matched syntax, and generates an explicit query requirement. Referring to the example in FIG. 6c, the explicit query requirement "Hailong building; traffic status" is extracted from the user query "Is Hailong Building congested?".

At S58, the requirement type judging unit 3015 judges which type the explicit query requirement belongs to, semantically understandable, syntactically understandable or syntactically non-understandable, through the following procedure:

1) judging whether the query concept is known: searching the knowledge base to find out whether the query concept is contained in the concept section of certain field knowledge base in the knowledge base; and determining an unknown query concept exists if there is no query concept in the explicit query requirement;

2) judging whether the question type is known: searching the language base to find out whether the question type is contained in the base; and determining an unknown question type exists if the question type is null in the explicit query requirement;

3) judging semantic consistency: first searching the language base and finding the concept constraint defined in the syntax corresponding to the question type; then, judging whether the concept in the explicit query requirement satisfies the above concept constraint based on the knowledge base by utilizing a constraint judging method the same as that in the semantic consistency judging unit 3013;

4) judging the requirement type: judging the type to which the user query belongs in accordance with the execution of the previous steps, and obtaining the judgment result as if all of the concepts and question types are known to the requirement type judging unit, and no semantic error occurs, it is a semantically-understandable query, if all of the concepts and question types are known to the requirement type judging unit, while some semantic error occurs, it is a syntactically-understandable query, if some concept and/or question type is unknown to the requirement type judging unit, it is a syntactically non-understandable query.

For example, the requirement type judging unit determines that the user query "Is Hailong Building congested?" as shown in FIG. 6c is a syntactically-understandable query.

Figure 7A:
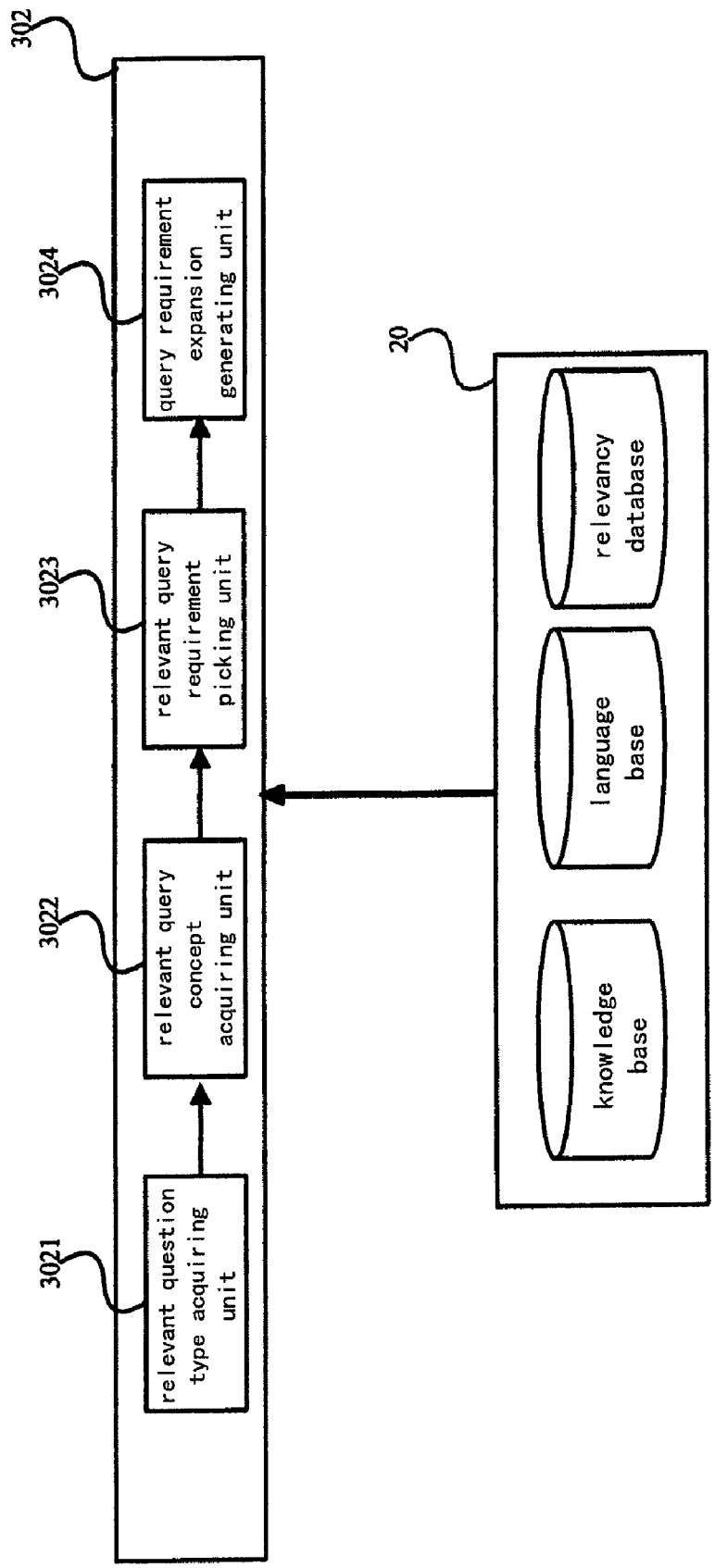
FIG. 7a is a schematic diagram of a semantically-understandable query requirement expanding device according to the present invention.

FIG. 7a is an exemplary block diagram of a semantically-understandable query requirement expanding device according to the present invention, which acquire an implicit query requirement by using a semantically-understandable query requirement from the user. The semantically-understandable query requirement expanding device comprises: a relevant question type acquiring unit 3021 which retrieves the relevancy database and obtains the question type that has a high service relevancy with the question type in the current user query requirement (explicit query requirement), as a retrieved relevant question type set; a relevant concept acquiring unit 3022 which, in the case that the relevant question type acquiring unit 3021 doesn't obtain any relevant question type, retrieves the relevancy database and obtains the concept that has a high relevancy with the concept in the explicit query requirement, as a retrieved relevant query concept set; a relevant query requirement picking unit 3023 which combines the relevant query concept set and the relevant question type set to obtain a relevant query requirement set, and searches the knowledge base and the language base to remove those relevant query requirements having semantic errors; and a query requirement expansion generating unit 3024 which calculates the relevancy between the obtained relevant query requirements and the explicit query requirement, and selects the relevant query requirement having a high relevancy, as the expanded user query requirement.

Figure 7B:
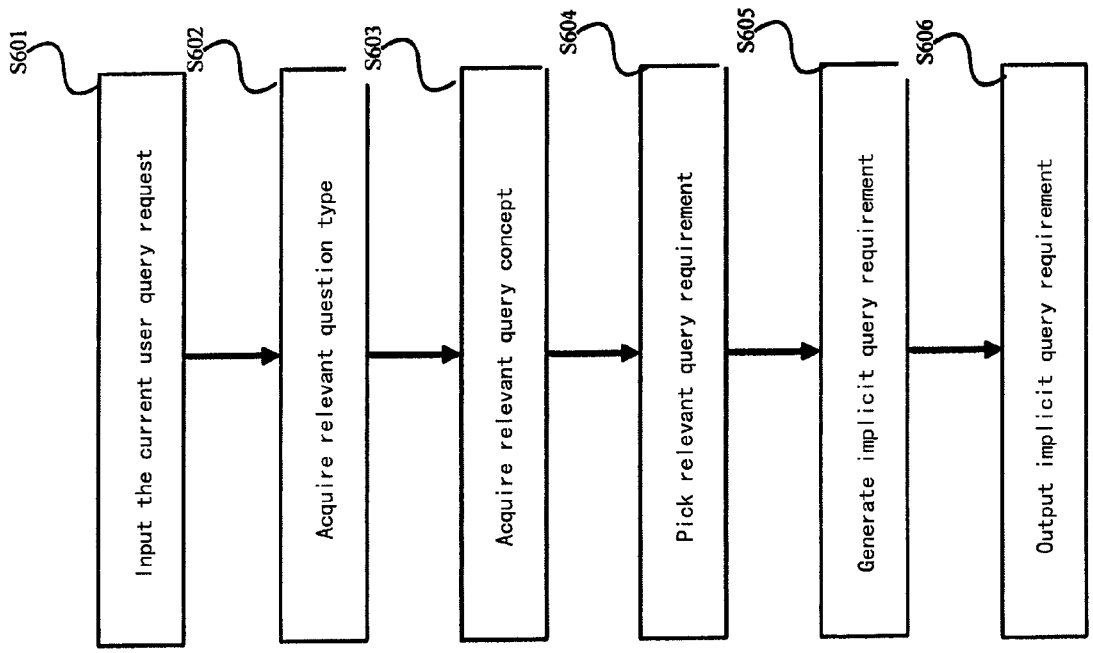
FIG. 7b is a flowchart of a semantically-understandable query requirement expanding method according to the present invention.

FIG. 7*b* shows the semantically-understandable query requirement expanding procedure. Beginning with S601, where the relevant question type acquiring unit 3021 obtains relevant question types. The relevant question type acquiring unit 3021 retrieves the service relevancy data in the relevancy database with respect to the question types contained in the explicit query requirement, and obtains the question types that have high service relevancies with the question type in the explicit query requirement, as a relevant question type set.

At S602, when no relevant question type is retrieved, the relevant query concept acquiring unit 3022 retrieves the semantic relevancy data and statistical relevancy data in the relevancy database with respect to the query concepts in the explicit query requirement, and obtains all concepts that have high relevancies with the query concept in the explicit query requirement, as a relevant query concept set.

At S603, the relevant query requirement picking unit 3023 picks out the useful relevant query requirements. At first, it combines the concepts and question type in the above obtained relevant query concept set and the relevant question type set on a one-to-one basis to obtain a relevant query requirement set, with each relevant query requirement being formed by a relevant query concept and a relevant question type. Then, the relevant query requirement picking unit 3023 searches the knowledge base and the language base and checks whether the concepts in each relevant query requirement satisfy the concept constraint defined in the language base by the question type of the relevant query requirement. If the answer is NO, it is indicated the relevant query requirement has certain semantic error and should be deleted. Here, the concept constraint judging method adopted by the relevant query requirement picking unit 3023 is the same as that used by the query requirement understanding device.

At the last step S604, for each picked-out relevant query requirement, the query requirement expansion generating unit 3024 calculates its relevancy with the explicit query requirement, the relevancy being equal to the sum of the relevancy between the query concepts in the relevant query requirement and the query concepts in the explicit query requirement and the relevancy between the question type in the relevant query requirement and the question type in the explicit query requirement. Following that, the query requirement expansion generating unit 3024 ranks the relevant query requirements depending on the value of the relevancy, and selects the relevant query requirement having a high relevancy as the implicit query requirement. It can also select more than one implicit query requirements.

Taking as an example the user query "where is Hailong Building?", the explicit query requirement is "Hailong Building; address". Since the service relevancy between the two question types "address" and "route" is very high, and "Hailong Building" satisfies the concept constraint "location" defined in the route syntax "<how|by what|through what><arrive|go|reach><?C(location)>", an expanded query can be generated as "Hailong Building; route".

After S601, the relevant question type acquiring unit 3021 can also combine the obtained relevant question type and the query concepts included in the explicit query requirement, as the implicit query requirement.

Figure 8A:
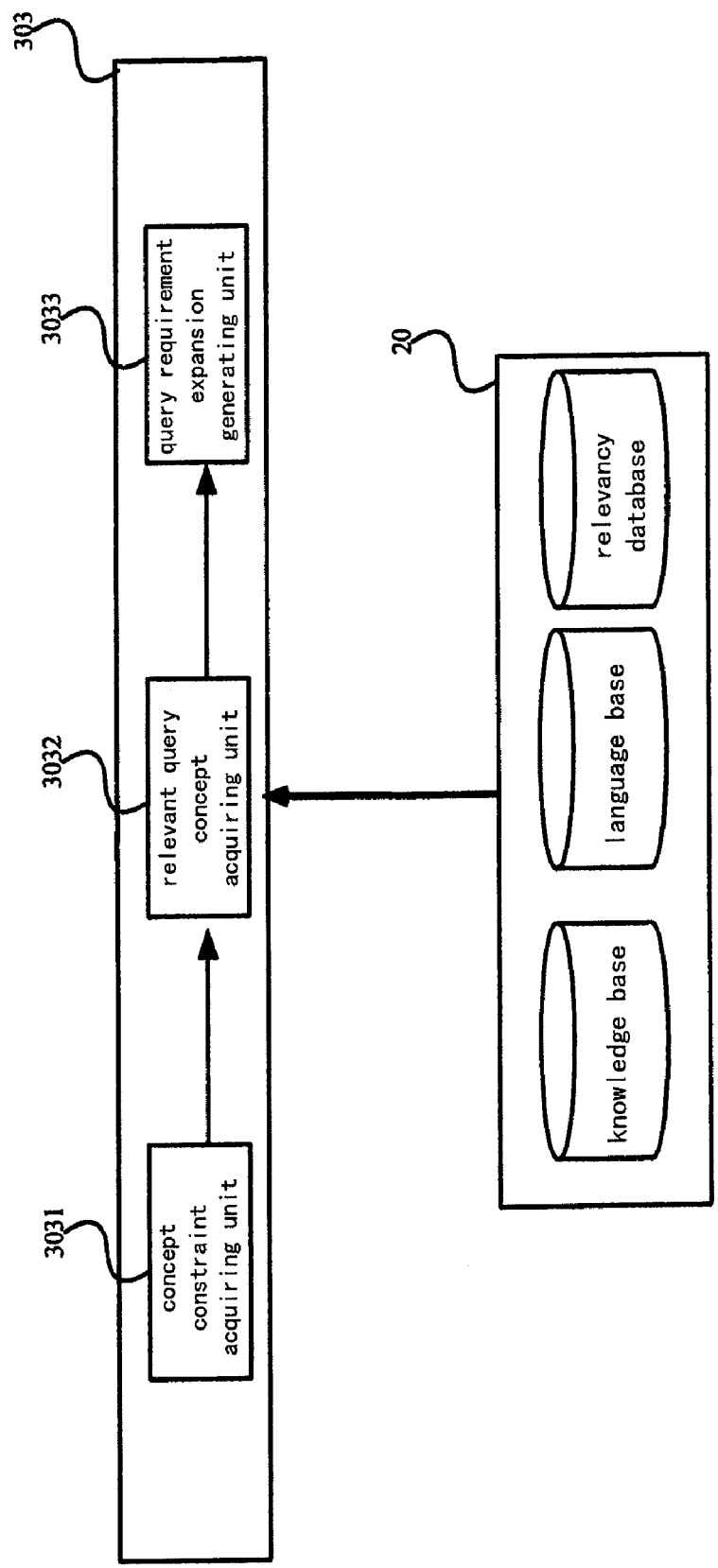
FIG. 8a is a schematic diagram of a syntactically-understandable query requirement expanding device according to the present invention.

FIG. 8*a* shows a schematic diagram of a syntactically-understandable query requirement expanding device, which expands the explicit user query requirement by utilizing the syntactically-understandable user query. The syntactically-understandable query requirement expanding device 303 comprises: a concept constraint acquiring unit 3031 which retrieves the language base and finds out which category in the knowledge base the query concept in the explicit query requirement belongs to; a relevant query concept acquiring unit 3032 which obtains a concept relevant to the query concept included in the explicit query requirement by utilizing the semantic relevancy data and statistical relevancy data in the relevancy database; and a query requirement expansion generating unit 3033 which combines the relevant query concept and the question type in the explicit query requirement to generate an implicit query requirement.

Figure 8B:
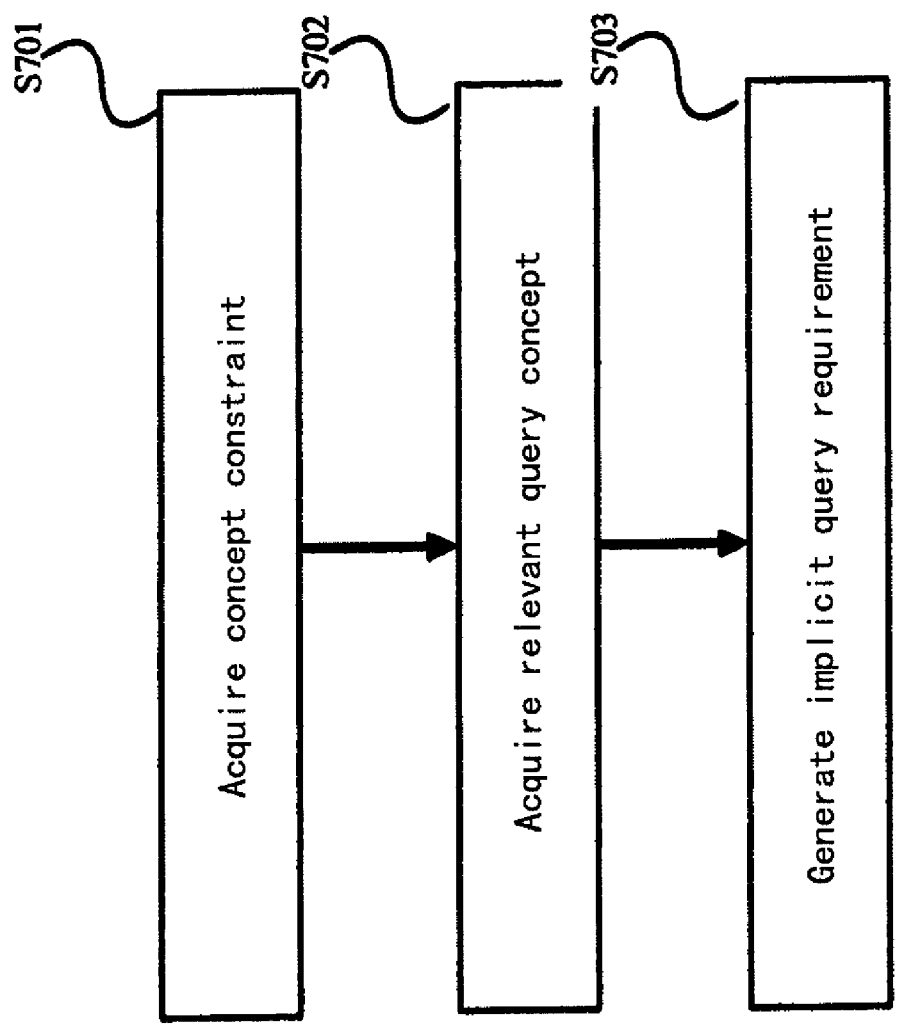
FIG. 8b is a flowchart of a syntactically-understandable query requirement expanding method according to the present invention.

FIG. 8*b* shows a flowchart of the syntactically-understandable query requirement expanding procedure by the syntactically-understandable query requirement expanding device.

At S701, the concept constraint acquiring unit 3031 retrieves the language base according to the question type of the explicit query requirement, and extracts the concept constraint defined in the syntax corresponding to the question type, that is, finding out which category in the knowledge base the query concept in the explicit query requirement belongs to. The relevant query concept acquiring unit 3032 obtains a concept relevant to the query concept included in the explicit query requirement by utilizing the knowledge base and the relevancy database. In other words, the relevant query concept acquiring unit 3032 retrieves the semantic relevancy data and statistical relevancy data in the relevancy database according to the query concept included in the explicit query requirement and extracts the set of all concepts having a high relevancy with the query concept included in the explicit query requirement. Then, the relevant query concept acquiring unit 3032 picks out the relevant query concepts satisfying the constraint by searching the knowledge base in accordance with the concept constraint obtained by the concept constraint acquiring unit 3031. Here, the concept constraint judging method adopted by the relevant query concept acquiring unit 3032 is the same as that used by the query requirement understanding device.

At S703, the query requirement expansion generating unit 3033 combines the obtained relevant query concept and the question type in the explicit query requirement to generate the implicit query requirement.

Taking as an example the user query "Is Hailong Building congested?", the explicit query requirement is "Hailong Building; traffic status". Since the query concept "Hailong Building" does not satisfy the concept constraint "road|bridge" defined in the syntax corresponding to the question type "traffic status", but the concept "Zhongguancun Street" relevant semantically and statistically to the "Hailong building" is a road and thus conforms to the constraint "road|bridge", it is possible to generate an implicit query requirement "Zhongguancun Street; traffic status".

Figure 9A:
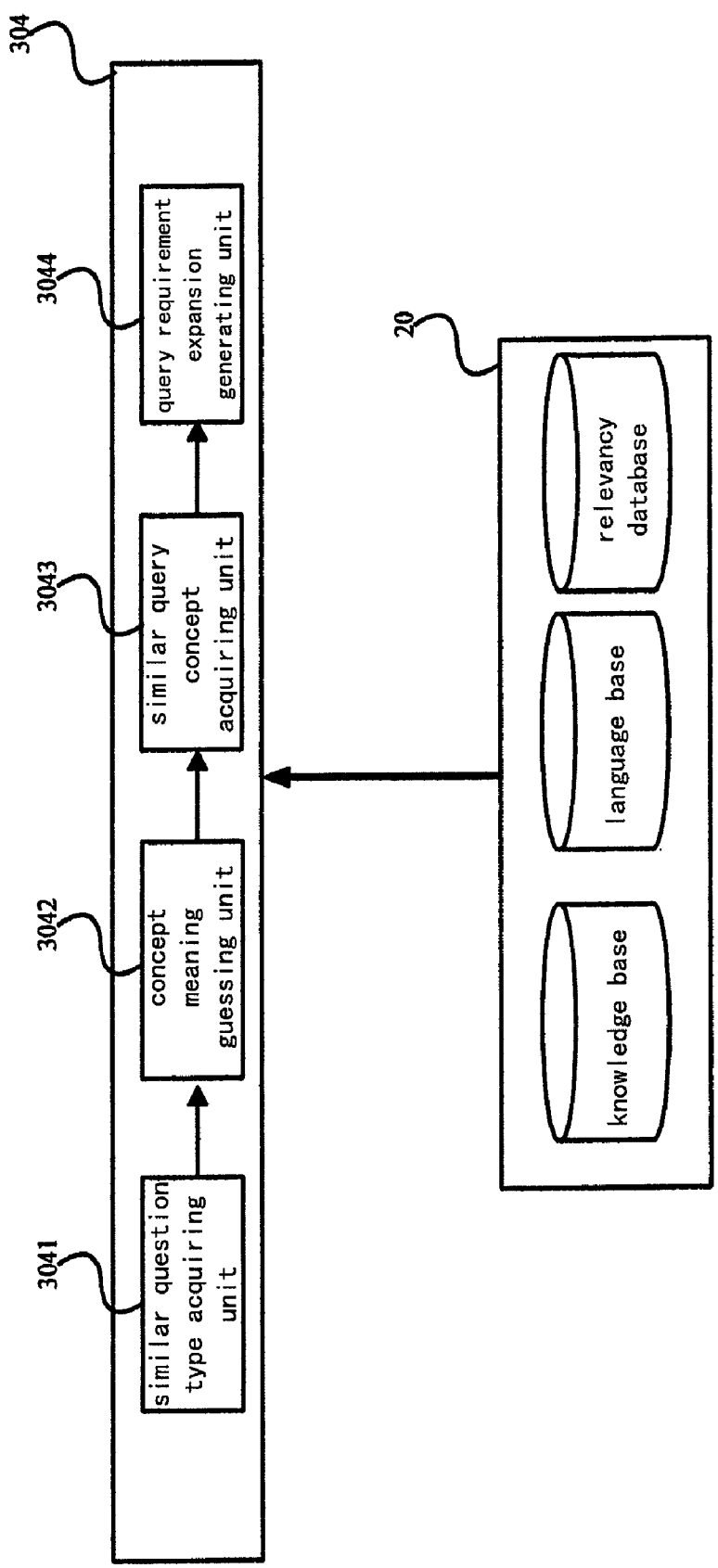
FIG. 9a is a schematic diagram of a syntactically non-understandable query requirement expanding device according to the present invention.

FIG. 9*a* shows a schematic diagram of a syntactically non-understandable query requirement expanding device, which handles a syntactically non-understandable query and utilizes the character-string similarity data in the relevancy database to acquire an implicit query requirement based on the explicit query requirement from the user. The syntactically non-understandable query requirement expanding device includes: a similar question type acquiring unit 3041 which acquires the question type that is similar to the question type included in the user query by retrieving the language base; a concept meaning guessing unit 3042 which guesses the meaning of the unrecognized concept in the user query by using the knowledge base and the language base; a similar query concept acquiring unit 3043 which acquires the query concept that is similar to the character string of the unrecognized concept according to the character-string similarity data in the relevancy database and the knowledge base; and a query requirement expansion generating unit 3044 which generates an implicit query requirement.

Figure 9B:
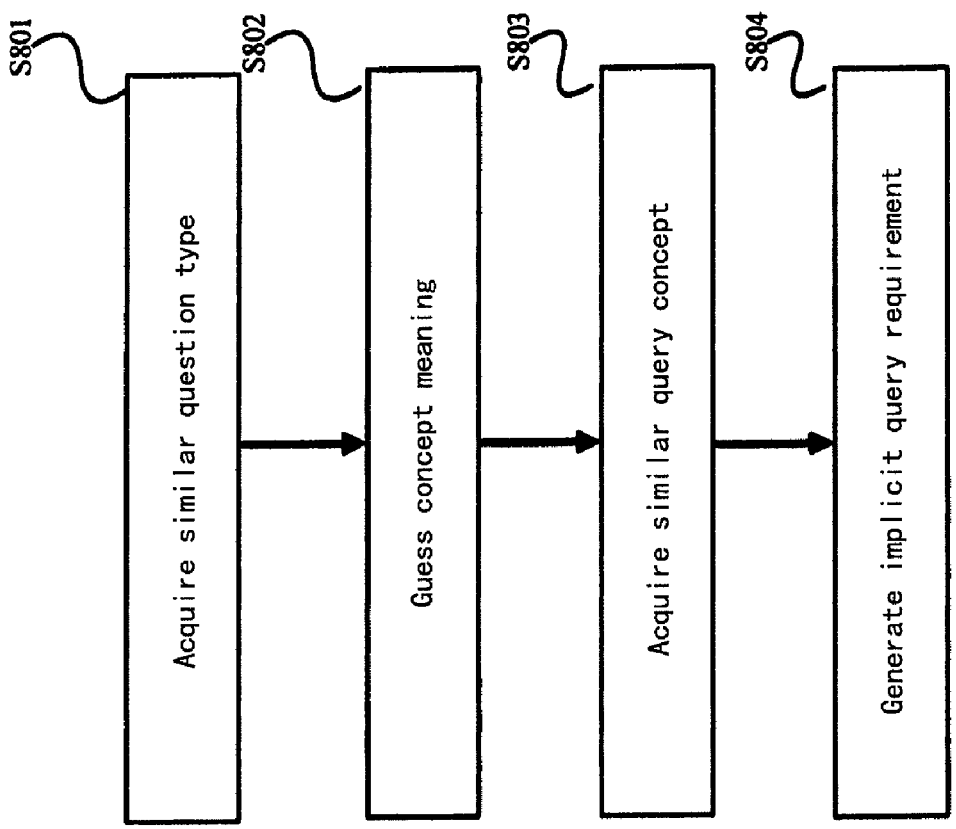
FIG. 9b is a flowchart of a syntactically non-understandable query requirement expanding method according to the present invention.

FIG. 9*b* shows a flowchart of the syntactically non-understandable query requirement expanding procedure by the syntactically non-understandable query requirement expanding device. At S801, if the query requirement understanding device 301 recognizes neither the concept nor the question type in the explicit query requirement, the similar question type acquiring unit 3041 retrieves the language base according to the parsed result of the user query by the query requirement understanding device 301 so as to find the syntax most similar to the user query and extract the question type corresponding to the syntax as a similar question type.

At S802, the concept meaning guessing unit 3042 guesses the category to which the unrecognized concept in the user query belongs by using a context-based concept meaning and a syntax-constraint-based concept meaning. The context-based concept meaning guess comprises searching in the knowledge base for each word present in the user query by the concept meaning guessing unit 3042, if the word is found in the knowledge base and a category related semantically to the word is also found in the knowledge base, guessing the unrecognized concept may has certain semantic association with the category. On the other hand, the syntax-constraint-based concept meaning guess comprises retrieving the language base by the concept meaning guessing unit 3042 based on the similar question type obtained by the similar question type acquiring unit 3041, and extracting the concept constraint defined in the syntax corresponding to the question type, that is, finding out the category to which the query concept should belong and thus the unrecognized concept may belong. Thereafter, the concept meaning guessing unit 3042 integrates the result of context-based concept meaning guess and the result of the syntax-constraint-based concept meaning guess by calculating the intersection between them so as to the category to which the unrecognized concept should belong.

At S803, the similar query concept acquiring unit 3043 acquires the query concept similar to the unrecognized concept according to the relevancy database and the knowledge base. At first, the similar query concept acquiring unit 3043 acquires all concept having a high character-string similarity to the unrecognized concept based on the character-string similarity data in the relevancy database. Then, if the concept meaning guessing unit 3042 has guessed the category to which the unrecognized concept should belong, it is necessary to pick out the concept belonging to the category obtained at S802 from all the character-string similar concepts. The constraint judging method used here is the same as that used by the query requirement understanding device.

At S804, the query requirement expansion generating unit 3044 generates an implicit query requirement by combining the above obtained similar concept and the similar question type.

Figure 3:
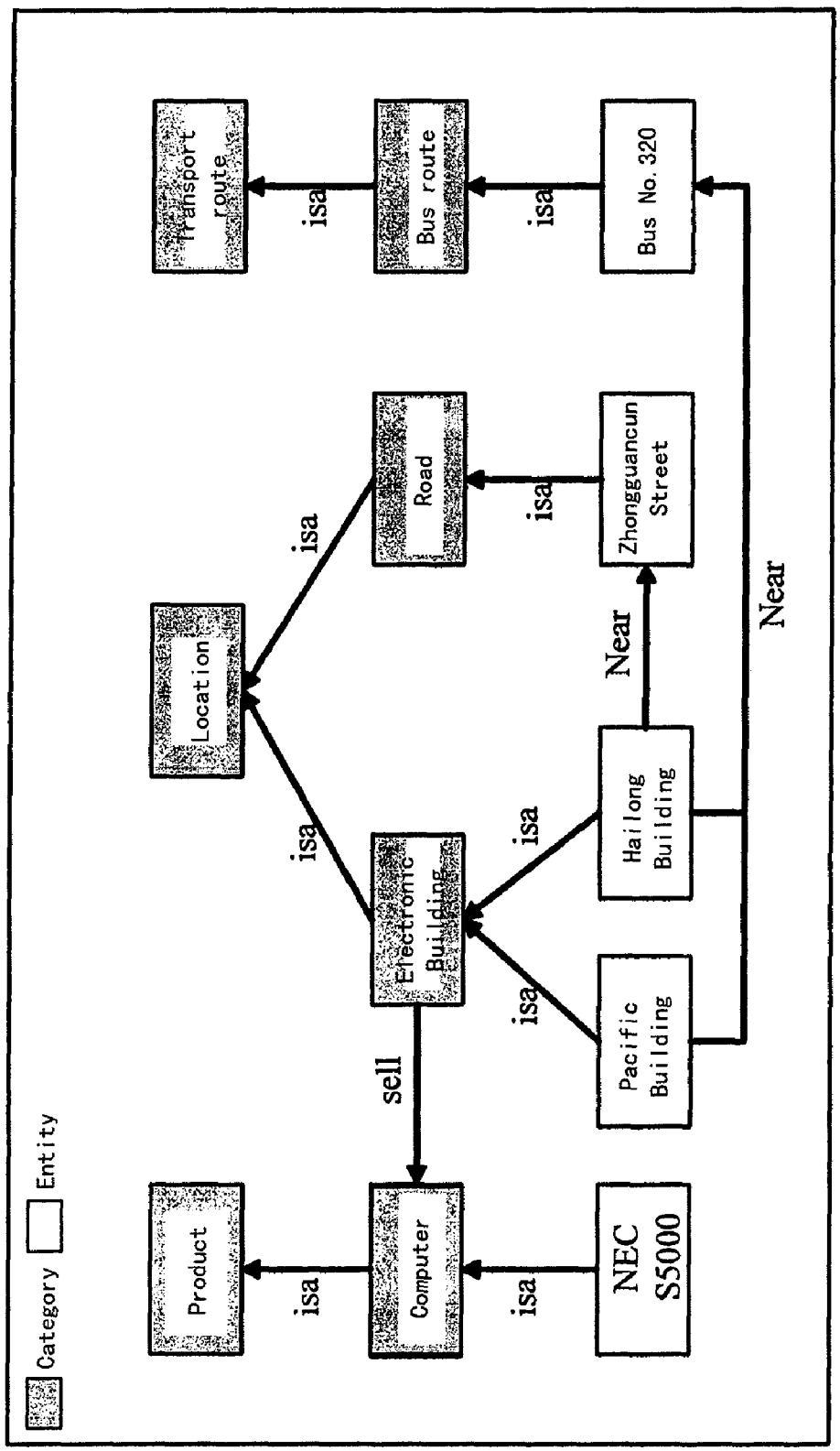
FIG. 3(b) is a schematic diagram of the hierarchy of the knowledge base according to the present invention.

Taking as an example the user query "I want to buy a computer, and how can I go to Pacific?", the system does not know "Pacific" and there is no matched question type. Therefore, the following steps can performed: first, finding the syntax similar to the user query, that is, "syntax:<how|by what|through what><go to|arrive|reach><?C(location)?", and extracting the question type "route" corresponding to the syntax; then, guessing the meaning of "Pacific", that is, from the knowledge base shown in FIG. 3(*b*), the relation between "Electronic Building" and the word "computer" in the user query is "sell(Electronic Building, computer)", the concept constraint in the syntax corresponding to the similar question type "route" is "location", and there is "isa(Electronic Building, location)", it is therefore possible to guess that "Pacific" belongs to the category "Electronic Building"; next, acquiring the similar concept, that is, since the "Pacific" is character-string similar to "Pacific Building" as shown in FIG. 6*a*, and "Pacific Building" belongs to the category "Electronic Building" as shown in FIG. 3(*b*), "Pacific Building" is considered as the similar concept; finally, generating the implicit query requirement "Pacific Building; route".

If the query requirement understanding device 301 does not recognize the concept in the explicit query requirement, while it recognizes the question type in the query, the concept meaning guessing unit 3042 guesses the category to which the unrecognized concept in the user query belongs by using a context-based concept meaning and a syntax-constraint-based concept meaning. The similar query concept acquiring unit 3043 acquires all concept having a high character-string similarity to the unrecognized concept based on the character-string similarity data in the relevancy database, as the similar concept. Then, if the concept meaning guessing unit 3042 has guessed the category to which the unrecognized concept should belong, it is necessary to pick out the concept belonging to the category from all the character-string similar concepts. The constraint judging method used here is the same as that used by the query requirement understanding device.

Then, the query requirement expansion generating unit 3044 generates an implicit query requirement by combining the above obtained similar concept and the question type in the explicit query requirement.

If the query requirement understanding device 301 does not recognize the question type in the explicit query requirement, while it recognizes the concept in the query, the similar question type acquiring unit 3041 retrieves the language base according to the parsed result of the user query by the query requirement understanding device 301 so as to find the syntax most similar to the user query and extract the question type corresponding to the syntax as a similar question type. After that, the query requirement expansion generating unit 3044 generates an implicit query requirement by combining the above obtained similar question type and the concept in the explicit query requirement.

After the above processes of semantically-understandable query, syntactically-understandable query and syntactically non-understandable query processing on the user query, the expanded answer generating device 305 generates an expanded answer corresponding to the implicit query requirement. The involved steps comprises: first, retrieving the language base in accordance with the question type in the implicit query requirement to obtain the query action corresponding to the question type, and placing the query concept in the implicit query requirement to the corresponding position of the query action so as to generate the specific action corresponding to the implicit query requirement; then, retrieving the knowledge base and an information base to obtain the corresponding answer. The specific implementation depends on the specific service field and the format of the information base. Here, known methods can be used and the description thereof will be omitted. For example, as to an implicit query requirement "Hailong Building; route" in which the query action corresponding to the question type "route" is "route query(?C)", "?C" is substituted with "Hailong Building" to obtain a specific action "route query (Hailong Building)". Thus, the answer can be retrieved as "go to Hailong Building by bus No. 320".

After the query requirement understanding processing on the user query, the direct answer generating device generates an answer directly corresponding to the explicit query requirement. The specific steps comprise: if the user query belongs to a semantically-understandable query, retrieving the language base, the knowledge base and the background information base in accordance with the explicit query requirement so as to generate a corresponding answer, where the specific retrieving and generating methods are the same as that for generating an expanded answer; if the user query belongs to a syntactically-understandable query or a syntactically non-understandable query, generating corresponding error indication information. For example, the explicit query requirement "Hailong Building, traffic status" belongs to a syntactically-understandable query, the system thus gives a direct answer "Hailong Building is not a road or a bridge, the system can not find out information about its traffic status".

Figure 10A:
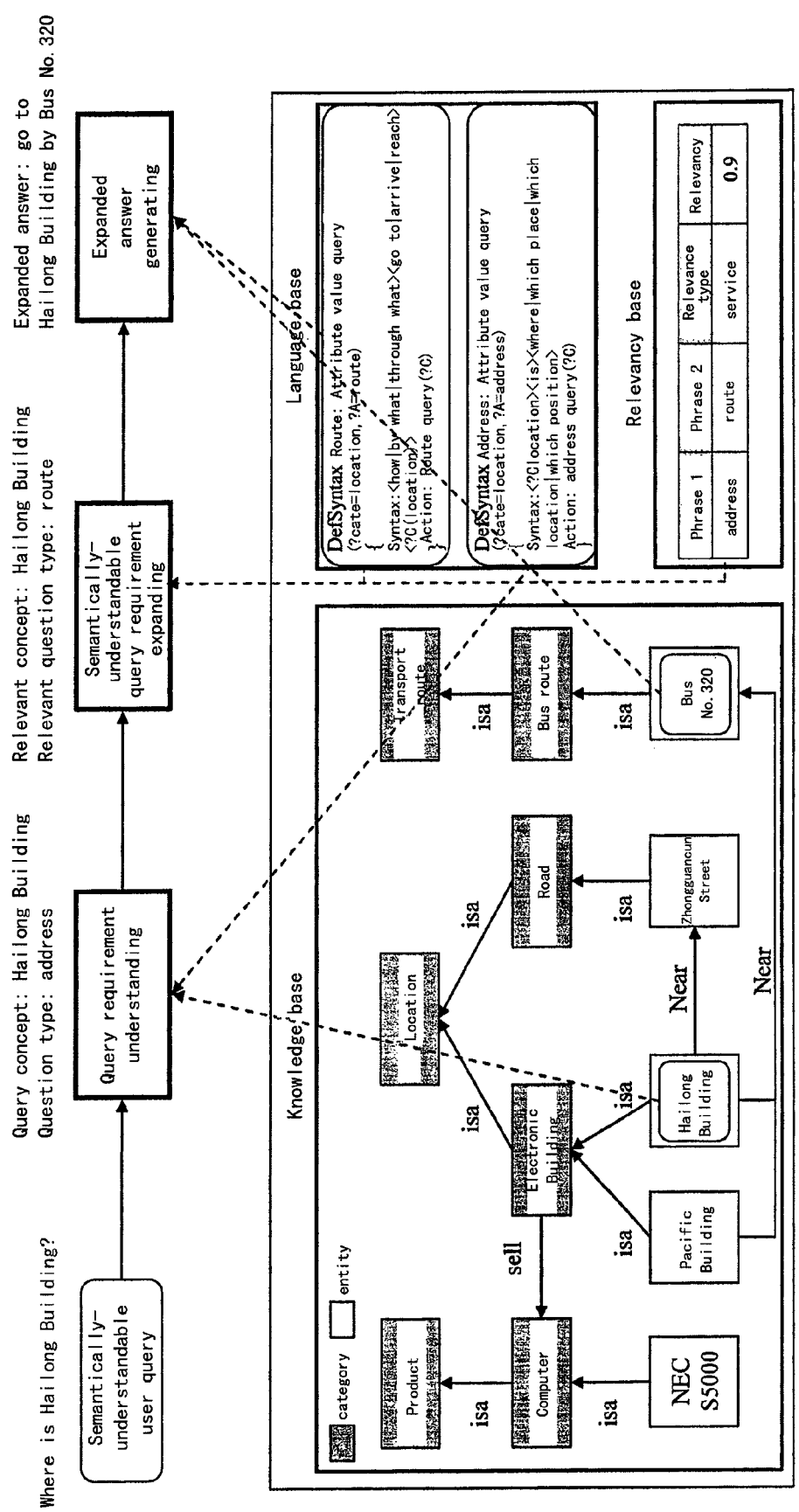
FIG. 10a-10c are three examples.
Figure 10B:
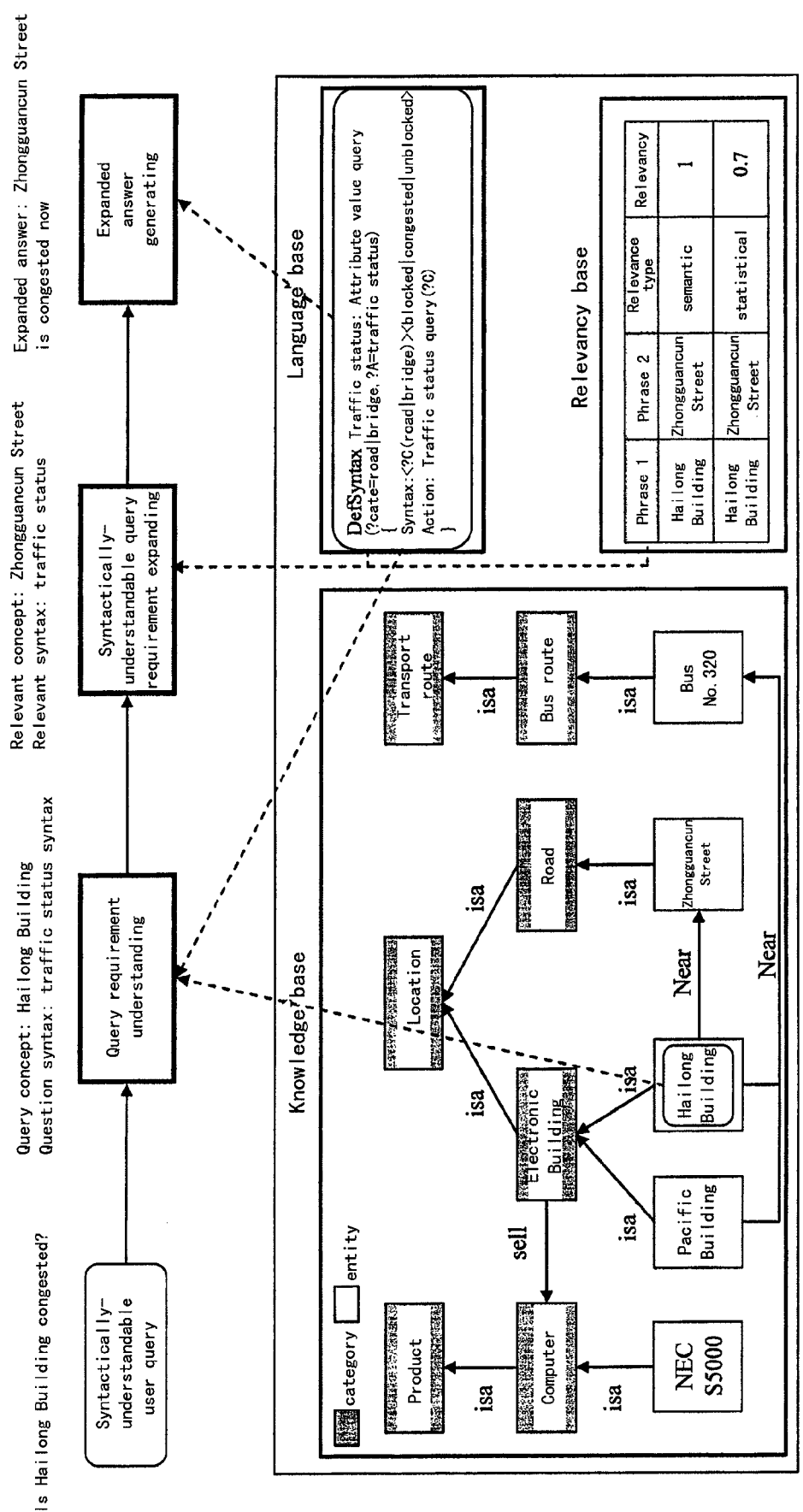
Figure 10C:
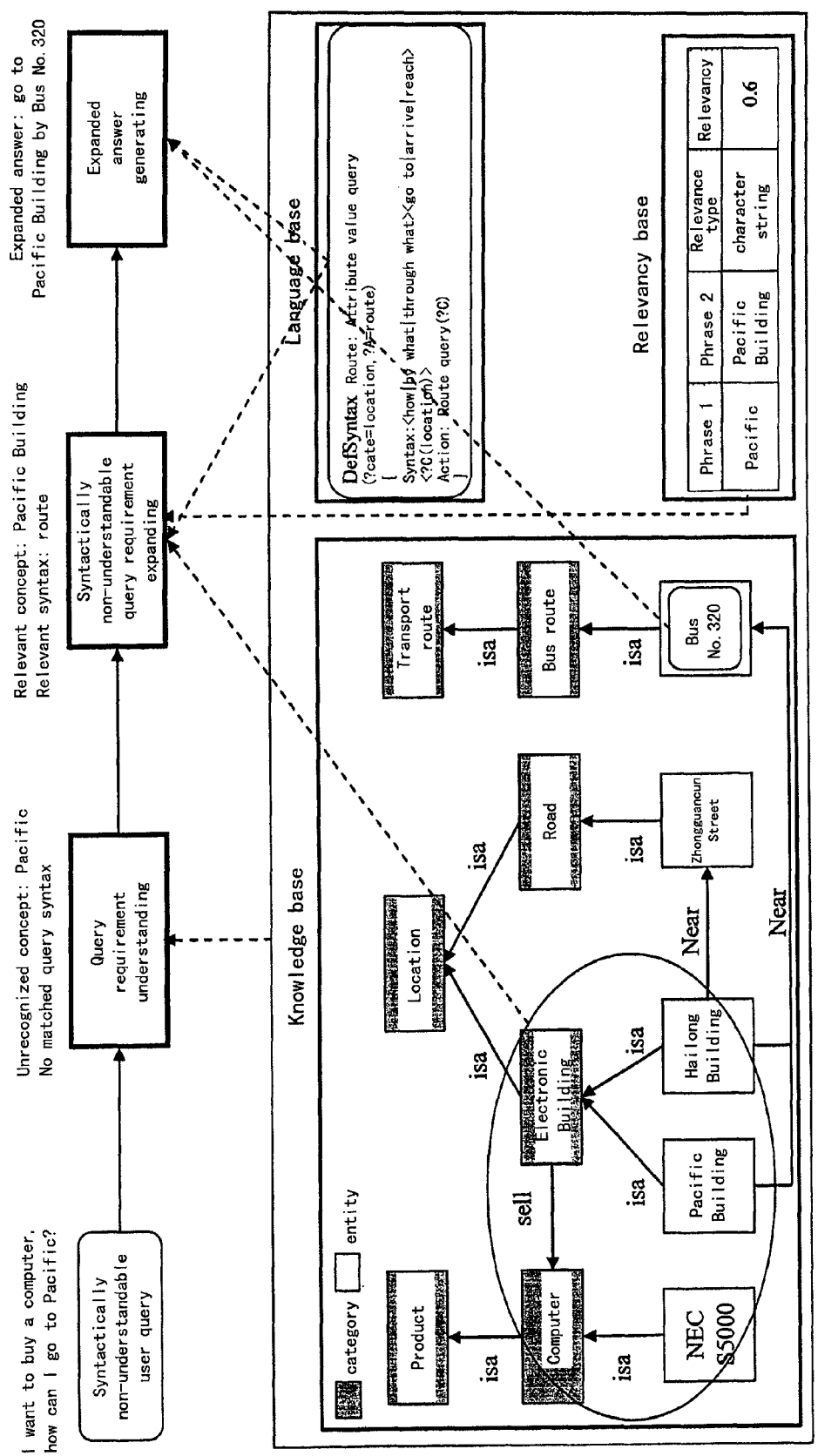

FIG. 10a-10c shows respectively three examples illustrating how to perform semantically-understandable, syntactically-understandable and syntactically non-understandable queries by utilizing the knowledge base, the language base and the relevancy database.

Figure 11:
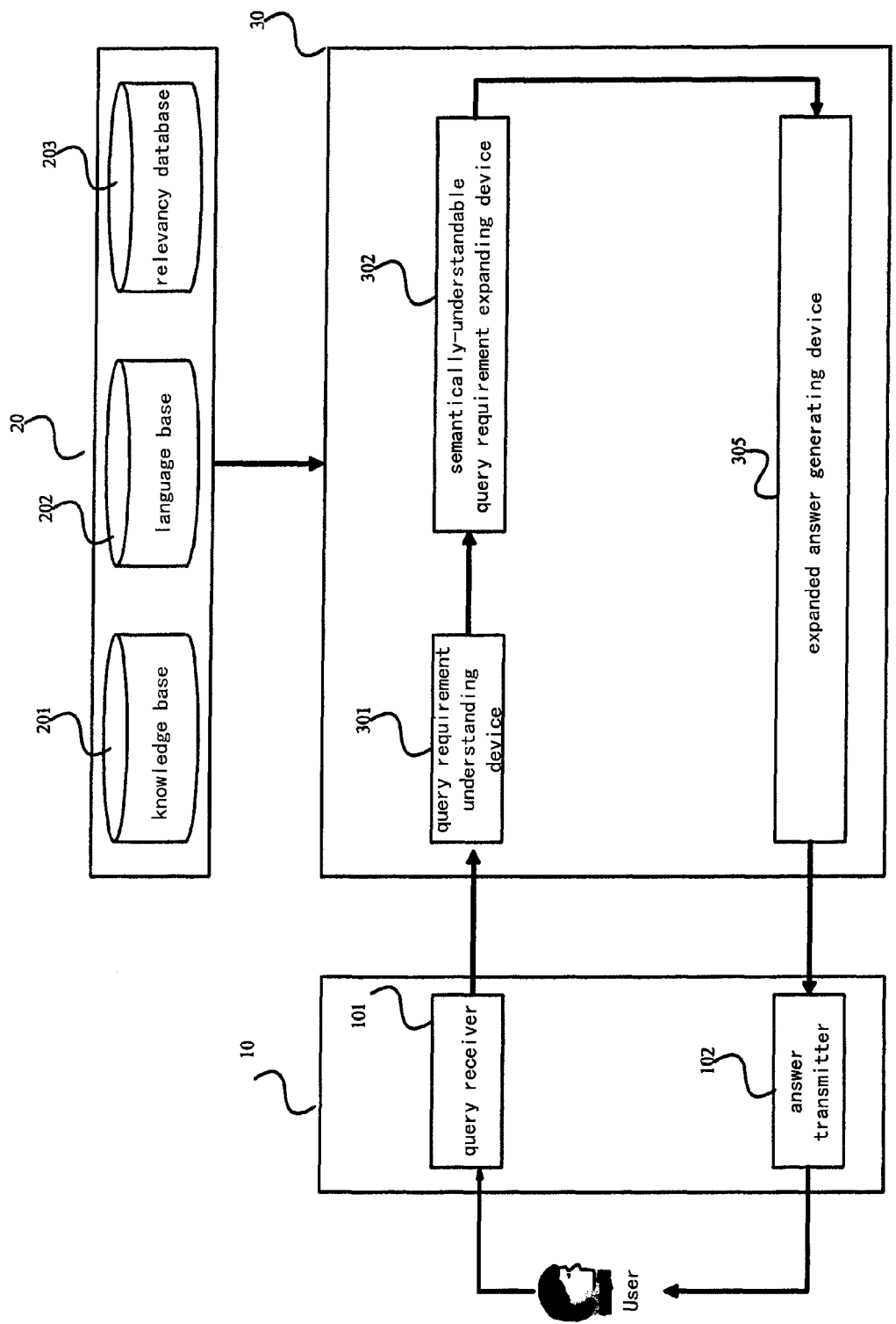
FIG. 11 a schematic diagram of an apparatus for expanding natural language query requirement according to another embodiment of the present invention.

FIG. 11 a schematic diagram of an apparatus for expanding natural language query requirement according to another embodiment of the present invention. Compared with the apparatus for expanding natural language query requirement shown in FIG. 2, the apparatus in FIG. 11 has no syntactically-understandable query requirement expanding device or syntactically non-understandable query requirement expanding device. The description of the like devices is not repeated for clarity. Besides, the knowledge base can be alternatively provided outside the apparatus for expanding natural language query requirement, though FIG. 11 shows that the knowledge base 201, the language base 202 and the relevancy database 203 are arranged internal to the apparatus. Further, the apparatus for expanding natural language query requirement can also include at least one of the three devices of the semantically-understandable, syntactically-understandable and syntactically non-understandable query requirement expanding devices.

According to still another embodiment of the present invention, the apparatus for expanding natural language query requirement can include only the syntactically-understandable query requirement expanding device or the syntactically non-understandable query requirement expanding device.

It will be appreciated that the query requirement expanding apparatus of the present invention can applied to various applications, such as information retrieval, intelligent teaching and recommendation system, though the description here gives the expansion processing of traffic status query exemplified by Chinese traffic status query. Also, it is apparent to those skilled in the art that the present invention can be applied to the expansion processing of traffic status query in other languages, such as English and Japanese.

While the present invention has been described with reference to the examples, those skilled in the art should understand that change can be made to the embodiments within the principle and spirit of the present invention, the scope of which is defined by appended claims and equivalents thereof.

What is claimed is:

1. An apparatus for expanding a query requirement, comprising:
   a query requirement understanding device which generates an explicit query requirement according to a user query request; and
   a query requirement expanding device which generates an implicit query requirement associated with the explicit query requirement, wherein
   the query requirement understanding device generates the explicit query requirement including a query concept and a question type by searching a knowledge base and a language base; and
   the query requirement expanding device generates the implicit query requirement including a query concept and a question type by searching the knowledge base, the language base and a relevancy database.

2. The apparatus according to claim 1, wherein
   the query requirement understanding device generates the explicit query requirement by analyzing a received user query semantically and syntactically; and
   the query requirement expanding device generates the implicit query requirement associated with the explicit query requirement by searching a requirement relevant database which is internal to the apparatus or external to the apparatus.

3. The apparatus according to claim 1, wherein the query requirement understanding device comprises:
   a parsing unit which parses the user query based on the knowledge base and the language base;
   a matching unit which matches the parsed user query with the language base to find a matched syntax;
   a semantic consistency judging unit which judges whether there is any semantic error in the concept in the user query based on the knowledge base and the language base;
   an explicit query requirement generating unit which generates the explicit query requirement corresponding to the matched syntax and including the query concept and the question type based on the matched syntax; and
   a requirement type judging unit which judges which type the explicit query requirement belongs to, semantically understandable, syntactically understandable or syntactically non-understandable, based on the knowledge base and the language base.

4. The apparatus according to claim 1, wherein the query requirement expanding device comprises:
   a semantically-understandable query requirement expanding device which
   retrieves the relevancy database according to a semantically-understandable explicit query requirement and obtains a relevant query requirement set that is associated with the semantically-understandable query requirement and includes an implicit query requirement containing a relevant query concept and a relevant question type or a query concept and a relevant question type.

5. The apparatus according to claim 4, wherein the semantically-understandable query requirement expanding device comprises:
   a relevant question type acquiring unit which retrieves the relevancy database and obtains the question type that has a high service relevancy with the question type in the explicit query requirement, as a retrieved relevant question type set;
   a relevant concept acquiring unit which retrieves the relevancy database and obtains the concept that has a high relevancy with the query concept in the explicit query requirement, as a retrieved relevant query concept set; and a relevant query requirement picking unit which combines the relevant query concept set and the relevant question type set to obtain a relevant query requirement set, and searches the knowledge base and the language base to remove those relevant query requirements having semantic errors; and a query requirement expansion generating unit which calculates the relevancy between the obtained relevant query requirement and the explicit query requirement, and selects the relevant query requirement having a high relevancy, as the implicit query requirement.

6. The apparatus according to claim 5, wherein the query requirement expansion generating unit calculates first relevancy between the relevant query concept and the query concept as well as second relevancy between the relevant question type and the question type, respectively, and adds the first relevancy and the second relevancy so as to obtain the relevancy between the relevant query requirement and the explicit query requirement, wherein the relevant query concept and the relevant question type are included in the relevant query requirement, and the query concept and the question type are included in the explicit query requirement.

7. The apparatus according to claim 1, wherein the query requirement expanding device comprises:

a syntactically-understandable query requirement expanding device which forms a relevant query concept set which has a high relevancy with the query concept contained in a syntactically-understandable explicit query requirement based on the knowledge base and the relevancy database, selects from the relevant query concept set at least one relevant query concept satisfying a predefined constraint condition by utilizing the knowledge base and combines the at least one selected relevant query concept with the question type of the explicit query requirement, as the implicit query requirement.

8. The apparatus according to claim 7, wherein the syntactically-understandable query requirement expanding device comprises:

a concept constraint acquiring unit which retrieves the language base according to the question type included in the explicit query requirement, and extracts the concept constraint defined in the syntax corresponding to the question type, as the constraint condition;

a relevant query concept acquiring unit which obtains a concept which has a high relevancy with the query concept included in the explicit query requirement by utilizing the relevancy database, and retrieves the knowledge base according to the constraint condition acquired from the concept constraint acquiring unit, so as to select the relevant query concept satisfying the constraint condition; and a query requirement expansion generating unit which combines the relevant query concept and the question type in the explicit query requirement to generate the implicit query requirement.

9. The apparatus according to claim 1, wherein the query requirement expanding device comprises:

a syntactically non-understandable query requirement expanding device which retrieves the question type similar to the question type included in the explicit query requirement by utilizing the language base, and/or searches the query concept similar to the unrecognized query concept in the explicit query requirement by utilizing the knowledge base and the relevancy database, so as to obtain an implicit query requirement including the similar query concept and/or the similar question type.

10. The apparatus according to claim 9, the syntactically non-understandable query requirement expanding device comprises:

a similar question type acquiring unit which acquires the question type that is similar to the question type included in the explicit query requirement by retrieving the language base, as the similar question type;

a similar query concept acquiring unit which acquires the query concept that 30 is similar to the character string of the unrecognized query concept according to the character string similarity data in the relevancy database, as the similar query concept; and a query requirement expansion generating unit which combines the similar query concept and the similar question type and generates the implicit query requirement.

11. The apparatus according to claim 10, the syntactically non-understandable query requirement expanding device further comprises:

a concept meaning guessing unit connected to the similar question type acquiring unit, which guesses the category to which the unrecognized query concept belongs by using the knowledge base and the concept constraint defined in the syntax corresponding to the similar question type;

wherein the similar query concept acquiring unit selects the concept that belongs to the same guessed category, from concepts that have a character string similar to the unrecognized query concept, as the similar concept.

12. The apparatus according to claim 1, wherein the query requirement expanding device comprises:

a semantically-understandable query requirement expanding device which retrieves the relevancy database according to a semantically-understandable explicit query requirement and obtains a relevant query requirement set that is associated with the semantically-understandable query requirement and includes an implicit query requirement containing a relevant query concept and a relevant question type or a query concept and a relevant question type; and a syntactically-understandable query requirement expanding device which forms a relevant query concept set which has a high relevancy with the query concept contained in a syntactically-understandable explicit query requirement based on the knowledge base and the relevancy database, selects from the relevant query concept set at least one relevant query concept satisfying a predefined constraint condition by utilizing the knowledge base and combines the at least one selected relevant query concept with the question type of the explicit query requirement, as the implicit query requirement.

13. The apparatus according to claim 12, wherein the semantically-understandable query requirement expanding device comprises:

a relevant question type acquiring unit which retrieves the relevancy database and obtains the question type that has a high service relevancy with the question type in the explicit query requirement, as a retrieved relevant question type set; a relevant concept acquiring unit which retrieves the relevancy database and obtains the concept that has a high relevancy with the query concept in the explicit query requirement, as a retrieved relevant query concept set; and
a relevant query requirement picking unit which combines the relevant query concept set and the relevant question type set to obtain a relevant query requirement set, and searches the knowledge base and the language base to remove those relevant query requirements having semantic errors; and
a query requirement expansion generating unit which calculates the relevancy between the obtained relevant query requirement and the explicit query requirement, and selects the relevant query requirement having a high relevancy, as the implicit query requirement.

14. The apparatus according to claim 13, wherein
the query requirement expansion generating unit calculates first relevancy between the relevant query concept and the query concept as well as second relevancy between the relevant question type and the question type, respectively, and adds the first relevancy and the second relevancy so as to obtain the relevancy between the relevant query requirement and the explicit query requirement, wherein the relevant query concept and the relevant question type are included in the relevant query requirement, and the query concept and the question type are included in the explicit query requirement.

15. The apparatus according to claim 12, wherein the syntactically-understandable query requirement expanding device comprises:
a concept constraint acquiring unit which retrieves the language base according to the question type included in the explicit query requirement, and extracts the concept constraint defined in the syntax corresponding to the question type, as the constraint condition;
a relevant query concept acquiring unit which obtains a concept which has a high relevancy with the query concept included in the explicit query requirement by utilizing the relevancy database, and retrieves the knowledge base according to the constraint condition acquired from the concept constraint acquiring unit, so as to select the relevant query concept satisfying the constraint condition; and
a query requirement expansion generating unit which combines the relevant query concept and the question type in the explicit query requirement to generate the implicit query requirement.

16. The apparatus according to claim 1, wherein the query requirement expanding device comprises:
a semantically-understandable query requirement expanding device which retrieves the relevancy database according to a semantically-understandable explicit query requirement and obtains a relevant query requirement set that is associated with the semantically-understandable query requirement and includes an implicit query requirement containing a relevant query concept and a relevant question type or a query concept and a relevant question type; and
a syntactically non-understandable query requirement expanding device
which retrieves the question type similar to the question type included in the explicit query requirement by utilizing the language base, and/or searches the query concept similar to the unrecognized query concept in the explicit query requirement by utilizing the knowledge base and the relevancy database, so as to obtain an implicit query requirement including the similar query concept and/or the similar question type.

17. The apparatus according to claim 16, wherein the semantically-understandable query requirement expanding device comprises:
a relevant question type acquiring unit which retrieves the relevancy database and obtains the question type that has a high service relevancy with the question type in the explicit query requirement, as a retrieved relevant question type set;
a relevant concept acquiring unit which retrieves the relevancy database and obtains the concept that has a high relevancy with the query concept in the explicit query requirement, as a retrieved relevant query concept set; and
a relevant query requirement picking unit which combines the relevant query concept set and the relevant question type set to obtain a relevant query requirement set, and searches the knowledge base and the language base to remove those relevant query requirements having semantic errors; and
a query requirement expansion generating unit which calculates the relevancy between the obtained relevant query requirement and the explicit query requirement, and selects the relevant query requirement having a high relevancy, as the implicit query requirement.

18. The apparatus according to claim 17, wherein
the query requirement expansion generating unit calculates first relevancy between the relevant query concept and the query concept as well as second relevancy between the relevant question type and the question type, respectively, and adds the first relevancy and the second relevancy so as to obtain the relevancy between the relevant query requirement and the explicit query requirement, wherein the relevant query concept and the relevant question type are included in the relevant query requirement, and the query concept and the question type are included in the explicit query requirement.

19. The apparatus according to claim 16, the syntactically non-understandable query requirement expanding device comprises:
a similar question type acquiring unit which acquires the question type that is similar to the question type included in the explicit query requirement by retrieving the language base, as the similar question type;
a similar query concept acquiring unit which acquires the query concept that is similar to the character string of the unrecognized query concept according to the character string similarity data in the relevancy database, as the similar query concept; and
a query requirement expansion generating unit which combines the similar query concept and the similar question type and generates the implicit query requirement.

20. The apparatus according to claim 19, the syntactically non-understandable query requirement expanding device further comprises:
a concept meaning guessing unit connected to the similar question type acquiring unit, which guesses the category to which the unrecognized query concept belongs by using the knowledge base and the concept constraint defined in the syntax corresponding to the similar question type;
wherein the similar query concept acquiring unit selects the concept that belongs to the same guessed category, from concepts that have a character string similar to the unrecognized query concept, as the similar concept.

21. The apparatus according to claim 1, wherein the query requirement expanding device comprises:

a syntactically-understandable query requirement expanding device which forms a relevant query concept set which has a high relevancy with the query concept contained in a syntactically-understandable explicit query requirement based on the knowledge base and the relevancy database, selects from the relevant query concept set at least one relevant query concept satisfying a predefined constraint condition by utilizing the knowledge base and combines the at least one selected relevant query concept with the question type of the explicit query requirement, as the implicit query requirement; and a syntactically non-understandable query requirement expanding device which retrieves the question type similar to the question type included in the explicit query requirement by utilizing the language base, and/or searches the query concept similar to the unrecognized query concept in the explicit query requirement by utilizing the knowledge base and the relevancy database, so as to obtain an implicit query requirement including the similar query concept and/or the similar question type.

22. The apparatus according to claim 21, wherein the syntactically-understandable query requirement expanding device comprises:

a concept constraint acquiring unit which retrieves the language base according to the question type included in the explicit query requirement, and extracts the concept constraint defined in the syntax corresponding to the question type, as the constraint condition;

a relevant query concept acquiring unit which obtains a concept which has a high relevancy with the query concept included in the explicit query requirement by utilizing the relevancy database, and retrieves the knowledge base according to the constraint condition acquired from the concept constraint acquiring unit, so as to select the relevant query concept satisfying the constraint condition; and a query requirement expansion generating unit which combines the relevant query concept and the question type in the explicit query requirement to generate the implicit query requirement.

23. The apparatus according to claim 21, the syntactically non-understandable query requirement expanding device comprises:

a similar question type acquiring unit which acquires the question type that is similar to the question type included in the explicit query requirement by retrieving the language base, as the similar question type; a similar query concept acquiring unit which acquires the query concept that is similar to the character string of the unrecognized query concept according to the character string similarity data in the relevancy database, as the similar query concept; and a query requirement expansion generating unit which combines the similar query concept and the similar question type and generates the implicit query requirement.

24. The apparatus according to claim 23, the syntactically non-understandable query requirement expanding device further comprises:

a concept meaning guessing unit connected to the similar question type acquiring unit, which guesses the category to which the unrecognized query concept belongs by using the knowledge base and the concept constraint defined in the syntax corresponding to the similar question type;

wherein the similar query concept acquiring unit selects the concept that belongs to the guessed category, from concepts that have a similar character string to the unrecognized query concept, as the similar concept.

25. The apparatus according to claim 1, wherein the query requirement expanding device comprises:

a semantically-understandable query requirement expanding device which retrieves the relevancy database according to a semantically-understandable explicit query requirement and obtains a relevant query requirement set that is associated with the semantically-understandable query requirement and includes an implicit query requirement containing a relevant query concept and a relevant question type or a query concept and a relevant question type;

a syntactically-understandable query requirement expanding device which forms a relevant query concept set which has a high relevancy with the query concept contained in a syntactically-understandable explicit query requirement based on the knowledge base and the relevancy database, selects from the relevant query concept set at least one relevant query concept satisfying a predefined constraint condition by utilizing the knowledge base and combines the at least one selected relevant query concept with the question type of the explicit query requirement, as the implicit query requirement; and a syntactically non-understandable query requirement expanding device which retrieves the question type similar to the question type included in the explicit query requirement by utilizing the language base, and/or searches the query concept similar to the unrecognized query concept in the explicit query requirement by utilizing the knowledge base and the relevancy database, so as to obtain an implicit query requirement including the similar query concept and/or the similar question type.

26. The apparatus according to claim 1, further comprises:

an expanded answer generating device which retrieves the language base, the knowledge base and an information base by utilizing the implicit query requirement so as to generate an expanded query answer.

27. The apparatus according to claim 1, further comprises:

a direct answer generating device which retrieves the language base, the knowledge base and the information base by utilizing the explicit query requirement so as to generate a direct query answer.

28. A method for expanding a query requirement, comprising:

a query requirement understanding step of generating, by a query requirement understanding device, an explicit query requirement according to a user query request; and a query requirement expanding step of generating, by a query requirement expanding device, an implicit query requirement associated with the explicit query requirement, wherein the query requirement understanding step comprises step of generating the explicit query requirement including a query concept and a question type by searching a knowledge base and a language base; and the query requirement expanding step comprises step of generating the implicit query requirement including a query concept and a question type by searching the knowledge base, the language base and a relevancy database.

29. The method according to claim 28, wherein
the query requirement understanding step further comprises step of generating the explicit query requirement by analyzing a received user query semantically and syntactically; and
the query requirement expanding step further comprises step of generating the implicit query requirement associated with the explicit query requirement by searching a requirement relevant database.

30. The method according to claim 28, wherein the query requirement understanding step comprises:
a parsing step of parsing the user query based on the knowledge base and the language base;
a matching step of matching the parsed user query with the language base to find a matched syntax;
a semantic consistency judging step of judging whether there is any semantic error in the concept in the user query based on the knowledge base and the language base;
an explicit query requirement generating step of generating the explicit query requirement corresponding to the matched syntax and including the query concept and the question type based on the matched syntax; and
a requirement type judging step of judging which type the explicit query requirement belongs to, semantically understandable, syntactically understandable or syntactically non- understandable, based on the knowledge base and the language base.

31. The method according to claim 28, wherein the query requirement expanding step comprises at least one of the following steps:
a semantically-understandable query requirement expanding step of retrieving the relevancy database according to a semantically-understandable explicit query requirement and obtaining a relevant query requirement set that is associated with the semantically-understandable query requirement and includes an implicit query requirement containing a relevant query concept and a relevant question type or a query concept and a relevant question type;
a syntactically-understandable query requirement expanding step of forming a
relevant query concept set which has a high relevancy with the query concept contained in a syntactically-understandable explicit query requirement based on the knowledge base and the relevancy database, selecting from the relevant query concept set at least one relevant query concept satisfying a predefined constraint condition by utilizing the knowledge base and combining the at least one selected relevant query concept with the question type of the explicit query requirement, as the implicit query requirement; and
a syntactically non-understandable query requirement expanding step of retrieving the question type similar to the question type included in the explicit query requirement by utilizing the language base, and/or searching the query concept similar to the unrecognized query concept in the explicit query requirement by utilizing the knowledge base and the relevancy database, so as to obtain an implicit query requirement including the similar query concept and/or the similar question type.

32. The method according to claim 31, wherein the semantically-understandable query requirement expanding step comprises:
a relevant question type acquiring step of retrieving the relevancy database and obtaining the question type that has a high service relevancy with the question type in the explicit query requirement, as a retrieved relevant question type set;
a relevant concept acquiring step of retrieving the relevancy database and obtaining the concept that has a high relevancy with the query concept in the explicit query requirement, as a retrieved relevant query concept set; and
a relevant query requirement picking step of combining the relevant query concept set and the relevant question type set to obtain a relevant query requirement set, and searching the knowledge base and the language base to remove those relevant query requirements having semantic errors; and
a query requirement expansion generating step of calculating the relevancy between the obtained relevant query requirement and the explicit query requirement, and selecting the relevant query requirement having a high relevancy, as the implicit query requirement.

33. The method according to claim 32, wherein
the query requirement expansion generating step comprises calculating first relevancy between the relevant query concept and the query concept as well as second relevancy between the relevant question type and the question type, respectively, and adding the first relevancy and the second relevancy so as to obtain the relevancy between the relevant query requirement and the explicit query requirement, wherein the relevant query concept and the relevant question type are included in the relevant query requirement, and the query concept and the question type are included in the explicit query requirement.

34. The method according to claim 31, wherein the syntactically-understandable query requirement expanding step comprises:
a concept constraint acquiring step of retrieving the language base according to the question type included in the explicit query requirement, and extracting the concept constraint defined in the syntax corresponding to the question type, as the constraint condition;
a relevant query concept acquiring step of obtaining a concept which has a high relevancy with the query concept included in the explicit query requirement by 30 utilizing the relevancy database, and retrieving the knowledge base according to the constraint condition acquired from the concept constraint acquiring unit, so as to select the relevant query concept satisfying the constraint condition; and
a query requirement expansion generating step of combining the relevant query concept and the question type in the explicit query requirement to generate the implicit query requirement.

35. The method according to claim 31, the syntactically non-understandable query requirement expanding step comprises:
a similar question type acquiring step of acquiring the question type that is similar to the question type included in the explicit query requirement by retrieving the language base, as the similar question type;
a similar query concept acquiring step of acquiring the query concept that is similar to the character string of the unrecognized query concept according to the character string similarity data in the relevancy database, as the similar query conc ept; and
a query requirement expansion generating step of combining the similar query concept and the similar question type and generating the implicit query requirement.

36. The method according to claim 35, the syntactically non-understandable query requirement expanding step further comprises:
- a concept meaning guessing step of guessing the category to which the unrecognized query concept belongs by using the knowledge base and the concept constraint defined in the syntax corresponding to the similar question type;
- wherein the similar query concept acquiring step comprises selecting the concept that belongs to the same guessed category, from concepts that have a character string similar to the unrecognized query concept, as the similar concept.

37. The method according to claim 28, wherein the relevancy database is generated by at least one of the following steps of:
- calculating the semantic relevancy between concepts in the knowledge base based on the knowledge base, so as to generate semantic relevant data;
- calculating the mutual information between concepts in the knowledge base by performing statistic on a corpus, so as to generate statistical relevant data;
- calculating the character string similarity among words based on a dictionary, so as to generate character string similar data; and
- calculating the relevancy between the question types corresponding to the matched syntax of each query based on a user query log, so as to generate service relevant data.

38. The method according to claim 28, wherein the knowledge base is generated by the following steps of:
- extracting concepts, attributes and relations between concepts from respective field information bases, so as to generate a knowledge base for each field; and
- extracting synonym mapping relation, language mapping relation and spatial mapping relation from synonym dictionaries, abbreviation rule libraries, multi-linguistic dictionaries and electronic maps, so as to generate a mapping knowledge base.

39. The method according to claim 28, wherein the language base is generated by the following steps of:
- collecting user query sentences in respective fields, calculating the similarity between the sentences and clustering them based on the similarity, so as to generate respective field query languages; and
- calculating the similarity between the respective field query languages, and extracting a public query language.

40. The method according to claim 28, further comprises:
- an expanded answer generating step of retrieving the language base, the knowledge base and an information base by utilizing the implicit query requirement so as to generate an expanded query answer.

41. The method according to claim 28, further comprises:
- a direct answer generating step of retrieving the language base, the knowledge base and the information base by utilizing the explicit query requirement so as to generate a direct query answer.

* * * * *